(12) United States Patent
Burazerovic et al.

(10) Patent No.: US 7,953,156 B2
(45) Date of Patent: May 31, 2011

(54) SYSTEM AND METHOD FOR ENCODING AND DECODING ENHANCEMENT LAYER DATA USING DESCRIPTIVE MODEL PARAMETERS

(75) Inventors: Dzevdet Burazerovic, Eindhoven (NL); Wilhelmus Hendrikus Bruls, Eindhoven (NL); Stijn Waele, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1474 days.

(21) Appl. No.: 10/569,126

(22) PCT Filed: Aug. 25, 2004

(86) PCT No.: PCT/IB2004/002770
§ 371 (c)(1),
(2), (4) Date: Feb. 23, 2006

(87) PCT Pub. No.: WO2005/022918
PCT Pub. Date: Mar. 10, 2005

(65) Prior Publication Data
US 2006/0262846 A1   Nov. 23, 2006

(30) Foreign Application Priority Data

Aug. 29, 2003 (EP) .................................... 03300104

(51) Int. Cl.
*H04B 1/66* (2006.01)
*H04N 7/12* (2006.01)
*H04N 11/02* (2006.01)
*H04N 11/04* (2006.01)

(52) U.S. Cl. ........... 375/240.24; 375/240.01; 375/240.1; 375/240.2

(58) Field of Classification Search ............. 375/240.01, 375/240.1, 240.2, 240.24
See application file for complete search history.

(56) References Cited

U.S. PATENT DOCUMENTS

| 5,917,609 A * | 6/1999 | Breeuwer et al. ........ 358/426.12 |
| 5,995,150 A * | 11/1999 | Hsieh et al. .............. 375/240.12 |
| 6,690,833 B1 * | 2/2004 | Chiang et al. ................. 382/236 |

(Continued)

FOREIGN PATENT DOCUMENTS

WO    03036979 A1    5/2003

OTHER PUBLICATIONS

Yuichiro Nakaya, et al: Model-Based/Waveform Hybrid Coding for Videotelephone Images, IEEE 1991, vol. 2, pp. 2741-2744.

(Continued)

*Primary Examiner* — Shuwang Liu
*Assistant Examiner* — Sung Ahn
(74) *Attorney, Agent, or Firm* — Edward W. Goodman

(57) ABSTRACT

There is provided an image encoding system (300, 400) including an encoder (300) for receiving input image data and generating corresponding encoded image output data. The encoder includes image processing features (310, 320, 330, 360) for processing said input image data to generate for each input image therein a plurality of corresponding image layers including at least one basic layer BLOP and at least one enhancement layer ELOP. Moreover, the encoder (300) further includes encoding features (350) for receiving said image layers and generating therefrom the encoded image output data. The encoding features further comprising block selecting features (340) for selecting one or more sub-regions of said at least one enhancement layer and modelling said one or more sub-regions for representation thereof in the image output data by way of descriptive model parameters.

21 Claims, 16 Drawing Sheets

U.S. PATENT DOCUMENTS

| | | | |
|---|---|---|---|
| 6,907,070 B2 * | 6/2005 | Wu et al. | 375/240.12 |
| 6,957,201 B2 * | 10/2005 | Alhadef et al. | 706/16 |
| 2003/0016877 A1 * | 1/2003 | Baharav et al. | 382/248 |
| 2004/0126021 A1 * | 7/2004 | Sull et al. | 382/233 |
| 2005/0013357 A1 * | 1/2005 | Cheong et al. | 375/240.01 |
| 2007/0126021 A1 * | 6/2007 | Ryu et al. | 257/103 |

OTHER PUBLICATIONS

Chau-Yun Hsu, et al: A Study of Feature-Mapped Approach to the Multiple Traveling Salesman Problem, Jun. 1991, IEEE, vol. 1SYMP, pp. 1589-1592, XP010046573

* cited by examiner

SYSTEM AND METHOD FOR ENCODING AND DECODING ENHANCEMENT LAYER DATA USING DESCRIPTIVE MODEL PARAMETERS

FIELD OF THE INVENTION

The present invention generally relates to signal processing. In particular, it relates to image encoding systems, for example such systems including video encoding systems, and corresponding image decoding systems, wherein during encoding image information is translated into a corresponding spatially layered format to which parametric modelling is applied to at least a part of the image information in the format. Moreover, the present invention also relates to a method of image encoding utilized within the systems. Furthermore, the present invention additionally relates to a method of image decoding utilized within the aforesaid systems. Additionally, the invention relates to methods of identification of optimal solutions where parametric modelling is applied; such methods of identification are potentially applicable also outside the technical field of image encoding systems in a wide variety of signal processing where selection of model order is required.

BACKGROUND TO THE INVENTION

Methods for encoding and correspondingly decoding image information have been known for many years. Such methods are of significance in DVD, mobile telephone digital image transmission, digital cable television and digital satellite television. In consequence, there exists a range of encoding and corresponding decoding techniques, some of which have become internationally recognised standards such as MPEG-2.

Since 1997, a Video Coding Experts Group (VCEG) of the International Telecommunications Union (ITU) has been working on a new video coding standard having an international denomination H.26L. In late 2001, a Moving Picture Expert Group (MPEG) of the International Standardization Organization/International Electrotechnical Commission (ISO/IEC) in collaboration with VCEG decided to work together as a Joint Video Team (JVT) in order to create a single technical design; the design is expected to be officially approved in 2003 by the ITU-T as "Recommendation H.264" and by ISO/IEC as "International Standard 14496-10" (MPEG-4 Part 10) Advanced Video Coding (AVC).

Principal objectives of the H.264/AVC standardization have been to significantly improve video compression efficiency and also to provide a "network-friendly" video representation addressing conversational and non-conversational applications; conversational applications relate to telephony whereas non-conversational applications relate to storage, broadcast and streaming of communication data. Presently, the standard H.264/AVC is broadly recognized as being able to achieve these objectives; moreover, the standard H264/AVC is also being considered for adoption by several other technical and standardization bodies dealing with video applications, for example the DVB-Forum and the DVD Forum.

Both software and hardware implementations of H.264/AVC encoders and decoders are becoming available.

Other forms of video encoding and decoding are also known. For example, in a U.S. Pat. No. 5,917,609, there is described a hybrid waveform and model-based image signal encoder and corresponding decoder. In the encoder and corresponding decoder, an original image signal is waveform-encoded and decoded so as to approximate the waveform of the original signal as closely as possible after compression. In order to compensate its loss, a noise component of the signal, namely a signal component which is lost by the waveform encoding, is model-based encoded and separately transmitted or stored. In the decoder, the noise is regenerated and added to the waveform-decoded image signal. The encoder and decoder elucidated in this U.S. Pat. No. 5,917,609 is especially pertinent to compression of medical X-ray angiographic images where loss of noise leads a cardiologist or radiologist to conclude that corresponding images are distorted. However, the encoder and corresponding decoder described are to be regarded as specialist implementations not necessarily complying with any established or emerging image encoding and corresponding decoding standards.

Referring again to the emerging aforementioned H.264 standard, this standard utilizes similar principles of spatial scalability known from existing standards such as MPEG-2. Application of the principles means that it is possible to encode a video sequence in two or more layers arranged in sequence from a highest layer to a lowest layer, each layer using a spatial resolution which is equal to or less than the spatial resolution of its next highest layer. The layers are mutually related in such a manner that a higher layer, often referred to as an "enhancement layer", represents a difference between original images in the video sequence and a lower encoded layer after which it has been locally decoded and scaled-up to a spatial resolution corresponding to the original images. In FIG. 1, there is shown a scheme for generating data corresponding to such an enhancement layer.

In FIG. 1, there is shown a known composite encoder indicated generally by 10. The encoder 10 comprises a scaling-down function 20, a first H.264 encoder 30, a local H.264 decoder 40, a scaling-up function 50, a difference function 60 and a second H.264 encoder 70. A video signal input IP is provided for inputting pixel image data. The input IP is coupled to a non-inverting input (+) of the difference function 60 and to an input of the scaling-down function 20. A scaled-down output of the scaling-down function 20 is coupled to an input of the first encoder 30. A first principal encoded output of the first encoder 30 is arranged to provide a base layer output BLOP. Moreover, a second local encoded output of the first encoder 30 is coupled to an input of a local H.264 decoder whose corresponding decoded output is coupled to an input of the scaling-up function 50. Furthermore, a scaled-up output of the scaling-up function 50 is coupled to an inverting input (−) of the difference function 60. A difference output of the difference function 60 is coupled to an input of the second encoder 70. An encoded output from the second encoder 70 is arranged to provide an enhancement layer output ELOP. The composite encoder 10 is defined as being a multi-layer encoder on account of input image data presented at the input IP being represented in a plurality of encoded outputs, for example at the BLOP and ELOP outputs, each output corresponding to a "layer".

The composite encoder 10 is susceptible to being implemented in software, hardware, or a mixture of both software and hardware. Moreover, the scaling-down function 20 and the scaling-up function 50 are preferably arranged to have matched and mutually inverse image scaling characteristics. Furthermore, the first encoder 30 and the local decoder 40 are preferably arranged to provide matched but inverse characteristics. Additionally, the first and second encoders 30, 70 are preferably endowed with mutually similar encoding characteristics.

Operation of the composite encoder 10 will now be described with reference to FIG. 1.

An input stream of pixel data corresponding to a sequence of images is provided at the input IP of the encoder 10. The stream is passed on a frame-by-frame basis to the non-inverting input (+) of the difference function 60 and also to the scaling-down function 20. A scaled-down version of the input IP provided from the scaling-down function 20 is presented to the first encoder 30 which encodes the scaled-down version to provide the base layer BLOP output. Moreover, the first encoder 30 also provides a similar encoded output to the local decoder 40 which reconstitutes a version of the scaled-down version of the input presented to the first encoder 20. The reconstituted version is then passed via the scaling-up function 50 to the inverting input (−) of the difference function 60. The difference function 60 thereby provides at its output presented to an input of the second encoder 70 an error signal corresponding to errors introduced by a combination of the first encoder 30 and its associated decoder 40, ignoring deviations introduced by the scaling functions 20, 50. This error signal is encoded to give rise to the enhancement-layer ELOP output.

If the BLOP AND ELOP outputs are conveyed via a transmission medium to a receiver which is operable to decode the BLOP and ELOP outputs using one or more decoders similar in operating characteristics to the local decoder 40 and then the resulting decoded ELOP and BLOP signals are combined, it is feasible to reconstruct the input IP at the receiver with enhanced accuracy as encoding and decoding errors are susceptible to being compensated at the receiver by effect of the ELOP signal.

However, the inventors have appreciated that the ELOP output typically will have a relatively high spatial-frequency noise-like characteristic which corresponds to demanding material for a video encoder such as an H.26L encoder; in the following, the term "noise-like" is to be construed to refer to a relative lack of spatial correlation concurrently with a significant part of signal energy being distributed at higher spatial frequencies. Therefore, it is not uncommon in practice that the quantity of data used to encode a given part of the enhancement layer exceeds the quantity of data needed for encoding a corresponding part of the original image. Such a high data quantity requirement for encoding the enhancement layer signal ELOP potentially represents a problem which the present invention seeks to address.

SUMMARY OF THE INVENTION

A first object of the invention is to provide an image encoding system, and a corresponding complementary decoding system, utilizing multi-layer image encoding and decoding which is susceptible to providing greater image data compression.

A second object of the invention is to provide a more efficient method of encoding images whilst conveying substantially complete information present within a sequence of images.

According to a first aspect of the present invention, there is provided an image encoding system including an encoder for receiving input image data and generating corresponding encoded image output data, the encoder including image processing means for processing said input image data to generate for each input image therein a plurality of corresponding image layers including at least one basic layer and at least one enhancement layer, and encoding means for receiving said image layers and generating therefrom the encoded image output data, said encoding means further comprising block selecting means for selecting one or more sub-regions of said at least one enhancement layer and modelling said one or more sub-regions for representation thereof in the image output data by way of descriptive model parameters.

The invention is of advantage in that it is capable of providing enhanced image encoding and decoding which is susceptible to greater data compression.

Preferably, in the system, the processing means is operable to represent one or more principal features of each input image in its corresponding at least one basic layer, and to represent residual image information corresponding to a difference between information in said input image and its corresponding at least one basic layer in said at least one enhancement layer. Subdivision of the input image to several layers is of benefit because it enables image subtleties to be isolated from principal features thereof, thereby enabling more efficient coding of the principal features, whilst allowing for progressive degrees of encoding residual details depending on a quality of eventual decoded image desired.

Preferably, in the system, said one or more sub-regions are represented in the encoded output data from the encoding means as corresponding data when determined by the selecting means to be unsuitable for modelling, and represented by equivalent model parameters when determined by the selecting means to be suitable for modelling. Applying modelling to features which are most appropriately modelled is of benefit in that an optimal compromise between image data compression and decoded quality is susceptible to being thereby achieved.

Preferably, in the system, for example for maintaining backward compatibility with existing contemporary encoding standards, the encoding means is arranged to encode the input image data in at least one of substantially ITU-T H.264 and ISO/IEC MPEG-4 AVC standards enhanced by inclusion of said model parameters. More preferably, on account of such contemporary standards allowing for dynamically assignable private data fields, said model parameters are included into one or more private data regions of said encoded image output data.

Preferably, in the system, said encoding means is operable to apply a spatial transform for translating said at least one selected sub-region to its corresponding model parameters for inclusion in said encoded image output data. More preferably, said transform includes a discrete cosine transform (DCT). Optionally, such DCT transform can be substituted with other types of mathematical transform.

Preferably, in the system, the transform is operable to generate a corresponding 2-dimensional data set for each corresponding sub-region, and the encoding means is arranged to concatenate said 2-dimensional data set to generate a corresponding 1-dimensional data set for inclusion in said model parameters in the encoded image output data. The inventors have identified that use of a DCT is especially suitable for a type of feature encountered in each sub-region whilst resulting in an acceptably small amount of data when, for example, subject to 2-D to 1-D concatenation. However, the present invention is susceptible to being implemented without a need for 2-D to 1-D concatenation. For example, direct parameter modelling of 2-D transform data from selected macroblocks can, if required, be employed.

Preferably, in the system, the encoding means is arranged to select a model order for use in encoding said one or more sub-regions in said corresponding model parameters by way of an optimization between quantity of model parameter data and accuracy to which said modelling parameters represent their one or more corresponding sub-regions. Use of optimization is capable of rendering the system provide better optimized data compression whilst substantially maintaining image quality.

Preferably, in the system, the encoding means is arranged to apply a statistical test to calculate a statistical error between image data corresponding to said one or more sub-regions and their corresponding model parameters, and apply selective parameter estimation to determine a model order to employ for generating the modelling parameters for the encoded output data. Use of interpolation is susceptible to reducing computational effort required to encode said one or more sub-regions and therefore rendering the system at least one of simpler to implement, capable of more rapid image encoding and less expensive to implement.

Preferably, in the system, said one or more sub-regions correspond substantially to spatial noise-like features present in said at least one input image. The inventors have found that spatial noise is susceptible to giving rise to considerable amounts of data if not represented by model parameters. Whereas inclusion of spatial noise-like features is important for accurate image recreation on decoding, the inventors have appreciated that the exact nature of the spatial noise is not so greatly important to image intelligibility and quality. In other words, the inventors have appreciated that the statistical properties of spatial noise-like features are more important for intelligibility and quality, rather than exact image pixel values.

Preferably, the system further includes a decoder for receiving the encoded output data from the encoder and for decoding said output data to recreate said input image, the decoder including decoding means for isolating said model parameters from directly encoded image data in the encoded output data, the decoder further including sub-region synthesizing means for receiving said decoded model parameters and generating data corresponding to said one or more sub-regions from said parameters, the decoder further comprising data merging means for combining said synthesized sub-region data with decoded direct image data to generate decoded output image data corresponding to said image input provided to the encoder.

Preferably, in the system, said encoded output image data from the encoder is conveyed to the decoder via a transmission medium, the medium including at least one of: the Internet, an optical data disc, a magnetic data disc, a DVD, CD, a solid-state memory device, a wireless communication network.

According to a second aspect of the present invention, there is provided an encoder for receiving input image data and generating corresponding encoded image output data, the encoder including image processing means for processing said input image data to generate for each input image therein a plurality of corresponding image layers including at least one basic layer and at least one enhancement layer, and encoding means for receiving said image layers and generating therefrom the encoded image output data, said encoding means further comprising block selecting means for selecting one or more sub-regions of said at least one enhancement layer and modelling said one or more sub-regions for representation thereof in the image output data by way of descriptive model parameters.

The invention is of advantage in that the encoder is susceptible to addressing at least one aforementioned object of the invention.

Preferably, in the encoder, the processing means is operable to represent one or more principal features of each input image in its corresponding at least one basic layer, and to represent residual image information corresponding to a difference between information in said input image and its corresponding at least one basic layer in said at least one enhancement layer.

Preferably, in the encoder, said one or more sub-regions are represented in the encoded output data from the encoding means as corresponding data when determined by the selecting means to be unsuitable for modelling, and represented by equivalent model parameters when determined by the selecting means to be suitable for modelling.

Preferably, in the encoder, the encoding means is arranged to encode the input image data in at least one of substantially ITU-T H.264 and ISO/IEC MPEG-4 AVC standards enhanced by inclusion of said model parameters. More preferably, said model parameters are included into one or more private data regions of said encoded image output data. Such use of private data regions is susceptible to rendering the encoder backwardly compatible.

Preferably, in the encoder, said encoding means is operable to apply a spatial transform for translating said at least one selected sub-region to its corresponding model parameters for inclusion in said encoded image output data. More preferably, said transform includes a discrete cosine transform (DCT). However, alternative transforms are also susceptible to being employed.

Preferably, in the encoder, the transform is operable to generate a corresponding 2-dimensional data set for each corresponding sub-region, and the encoding means is arranged to concatenate said 2-dimensional data set to generate a corresponding 1-dimensional data set for inclusion in said model parameters in the encoded image output data.

Preferably, in the encoder, the encoding means is arranged to select a model order for use in encoding said one or more sub-regions in said corresponding model parameters by way of a optimization between quantity of model parameter data and accuracy to which said modelling parameters represent their one or more corresponding sub-regions.

Preferably, in the encoder, the encoding means is arranged to apply a statistical test to calculate a statistic error between image data corresponding to said one or more sub-regions and their corresponding model parameters, and apply selective parameter estimation to determine a model order to employ for generating the modelling parameters for the encoded output data.

Preferably, in the encoder, said one or more sub-regions correspond substantially to spatial noise-like features present in said input image.

According to a third aspect of the present invention, there is provided a decoder for use for an encoder according to the second aspect of the invention, the decoder being operable to receive encoded output data from the encoder and for decoding said output data to recreate a corresponding input image, the decoder including decoding means for isolating model parameters from directly encoded image data in the encoded output data, the decoder further including sub-region synthesizing means for receiving said decoded model parameters and generating data corresponding to one or more sub-regions from said parameters, the decoder further comprising data merging means for combining said synthesized sub-region data with decoded direct image data to generate decoded output image data corresponding to said image input provided to the encoder.

According to a fourth aspect of the present invention, there is provided a transmission medium for conveying said encoded output image data thereon from an encoder according to the first aspect of the invention, the medium including at least one of: an optical data disc, a magnetic data disc, a DVD, CD, a solid-state memory device. It will be appreciated that other types of data carrier are also possible.

According to a fifth aspect of the present invention, there is provided a method of encoding image data in an encoder, the method including the steps of:

(a) arranging for the encoder to include processing means and block selecting means;
(b) applying the processing means to process said input image data to generate for each input image therein a plurality of corresponding image layers including at least one basic layer and at least one enhancement layer;
(c) applying the selecting means to select one or more sub-regions of said at least one enhancement layer and modelling said one or more sub-regions for representation thereof in the image output data by way of descriptive model parameters; and
(d) combining the model parameters with encoded data corresponding at least partly to the plurality of image layers for generating therefrom encoded image output data corresponding to said input image data.

Preferably, in the method, the processing means is operable to represent one or more principal features of each input image in its corresponding at least one basic layer, and to represent residual image information corresponding to a difference between information in said input image and its corresponding at least one basic layer in said at least one enhancement layer. Thus, in other words, the at least one basic layer includes most of principal details necessary for rendering the image recognizable when decoded again, and the at least one enhancement layer includes fine detail to complement and refine the image conveyed in the at least one basic layer.

Preferably, in the method, said one or more sub-regions are represented in the encoded output data from the encoding means as corresponding data when determined by the selecting means to be unsuitable for modelling, and represented by equivalent model parameters when determined by the selecting means to be suitable for modelling.

Preferably, in the method, the encoding means is arranged to encode the input image data in at least one of substantially ITU-T H.264 and ISO/IEC MPEG-4 AVC standards enhanced by inclusion of said model parameters. More preferably, said model parameters are included into one or more private data regions of said encoded image output data.

Preferably, in the method, said encoding means is operable to apply a spatial transform for translating said at least one selected sub-region to its corresponding model parameters for inclusion in said encoded image output data. More preferably, said transform includes a discrete cosine transform (DCT). However, other types of transform are susceptible to being alternatively or additionally employed.

Preferably, in the method, the transform is operable to generate a corresponding 2-dimensional data set for each corresponding sub-region, and the encoding means is arranged to concatenate said 2-dimensional data set to generate a corresponding 1-dimensional data set for inclusion in said model parameters in the encoded image output data.

Preferably, in the method, the encoding means is arranged to select a model order for use in encoding said one or more sub-regions in said corresponding model parameters by way of an optimization between quantity of model parameter data and accuracy to which said modelling parameters represent their one or more corresponding sub-regions. More preferably, the encoding means is arranged to apply a statistical test to calculate a statistical error between image data corresponding to said one or more sub-regions and their corresponding model parameters, and apply selective parameter estimation to determine a model order to employ for generating the modelling parameters for the encoded output data.

Preferably, in the method, said one or more sub-regions correspond substantially to spatial noise-like features present in said at least one input image. Such spatial noise-like features are capable of enabling the method to operate more efficiently as more sub-regions are then susceptible to being represented by model parameters.

Preferably, in the method, there is further comprised the step of including a decoder for receiving the encoded output data from the encoder and for decoding said output data to recreate said input image, the decoder including decoding means for isolating said model parameters from directly encoded image data in the encoded output data, the decoder further including sub-region synthesizing means for receiving said decoded model parameters and generating data corresponding to said one or more sub-regions from said parameters, the decoder further comprising data merging means for combining said synthesized sub-region data with decoded direct image data to generate decoded output image data corresponding to said image input provided to the encoder.

Preferably, in the method, said encoded output image data from the encoder is conveyed to the decoder via a transmission medium, the medium including at least one of: the Internet, an optical data disc, a magnetic data disc, a DVD, CD, a solid-state memory device, a wireless communication network.

Preferably, the invention is capable of being implemented in one or more of hardware, software and a combination of software and hardware.

It will be appreciated that features of the invention are susceptible to being combined in any combination without departing from the scope of the invention.

DESCRIPTION OF THE DIAGRAMS

Embodiments of the invention will now be described, by way of example only, with reference to the following diagrams wherein.

DESCRIPTION OF EMBODIMENTS OF THE INVENTION

Figure 1:
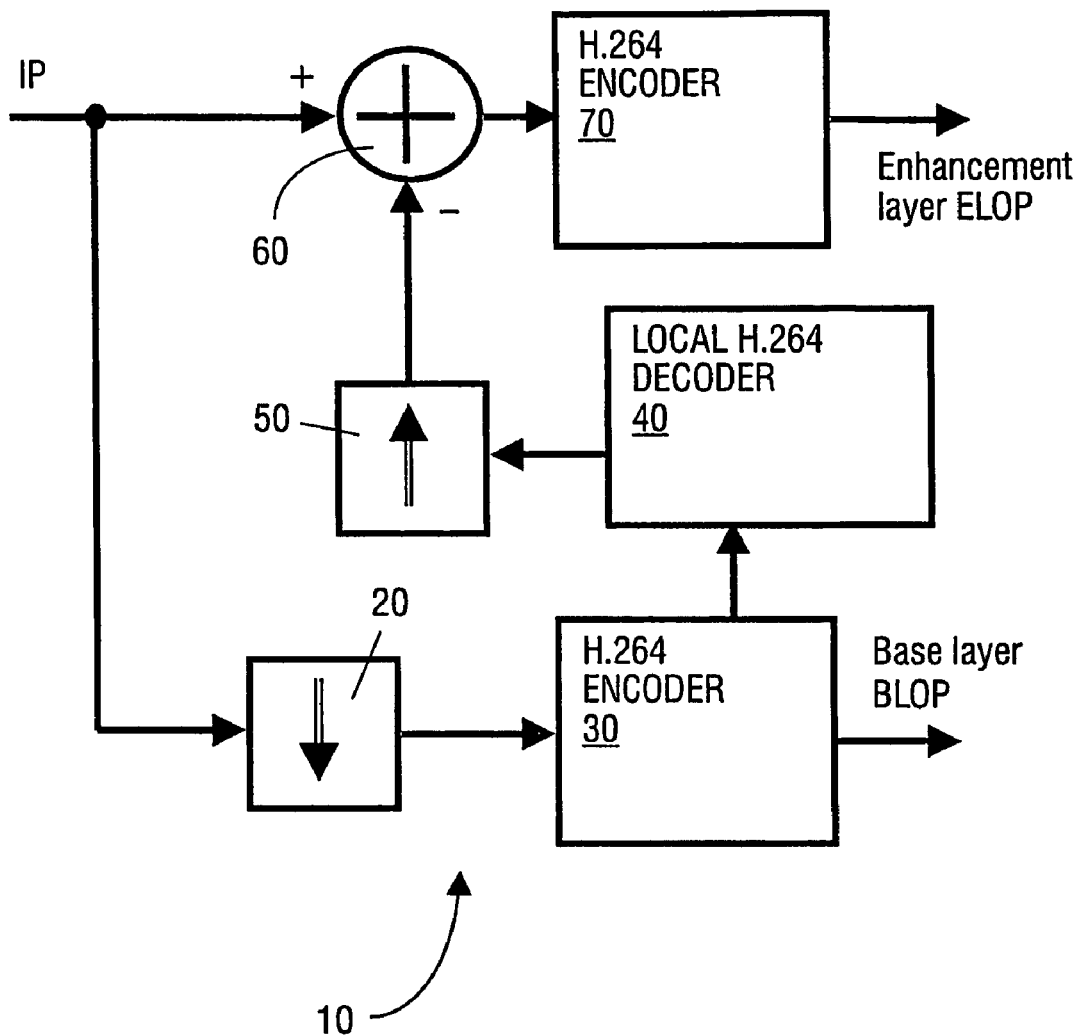
FIG. 1 is a schematic diagram of a composite encoder utilizing multi-layer image encoding.

Referring to FIG. 1 described in the foregoing, the signal from the scaling-up function 50 that is subtracted from the input IP to generate the enhancement-layer ELOP signal via the second encoder 70 is obtained by passing the input IP through several processing steps, namely down-scaling, encoding, decoding and up-scaling. Each of these steps are operable to introduce distortions; for example, re-sampling is susceptible to distorting higher spatial frequency information present in the images of the input IP on account of the use of imperfect filtering in a manner associated with the Nyquist criterion, whilst coding introduces artefacts which are mostly attributable to the quantization of higher transform coefficients. All these distortions are substantially non-linear, so an overall distortion presented to the inverting input (−) of the difference function 60 cannot simply be quantified as their sum, for example sum of squares of errors. Nevertheless, the inventors have appreciated that the overall distortion in the signal presented to the inverting (−) input of the difference function 60 will still affect predominantly higher spatial frequency features, for example edges and texture details present in the images of the input IP. Whereas distortions of higher-spatial frequency are dominant and can be anticipated, the inventors have appreciated that distortions will also appear in lower parts of the spatial frequency spectrum in a more random manner. Such lower-frequency spatial distortions are manifest in those parts of the signal presented to the inverting input (−) of the difference function 60 corresponding to less detailed parts of the original image signal IP. Moreover, the inventors have also appreciated that noise presented to this inverting (−) input is susceptible to originating from noise already present in the input signal IP. Such image encoding errors render the encoder 10 of FIG. 1 sub-optimal.

Figure 2:
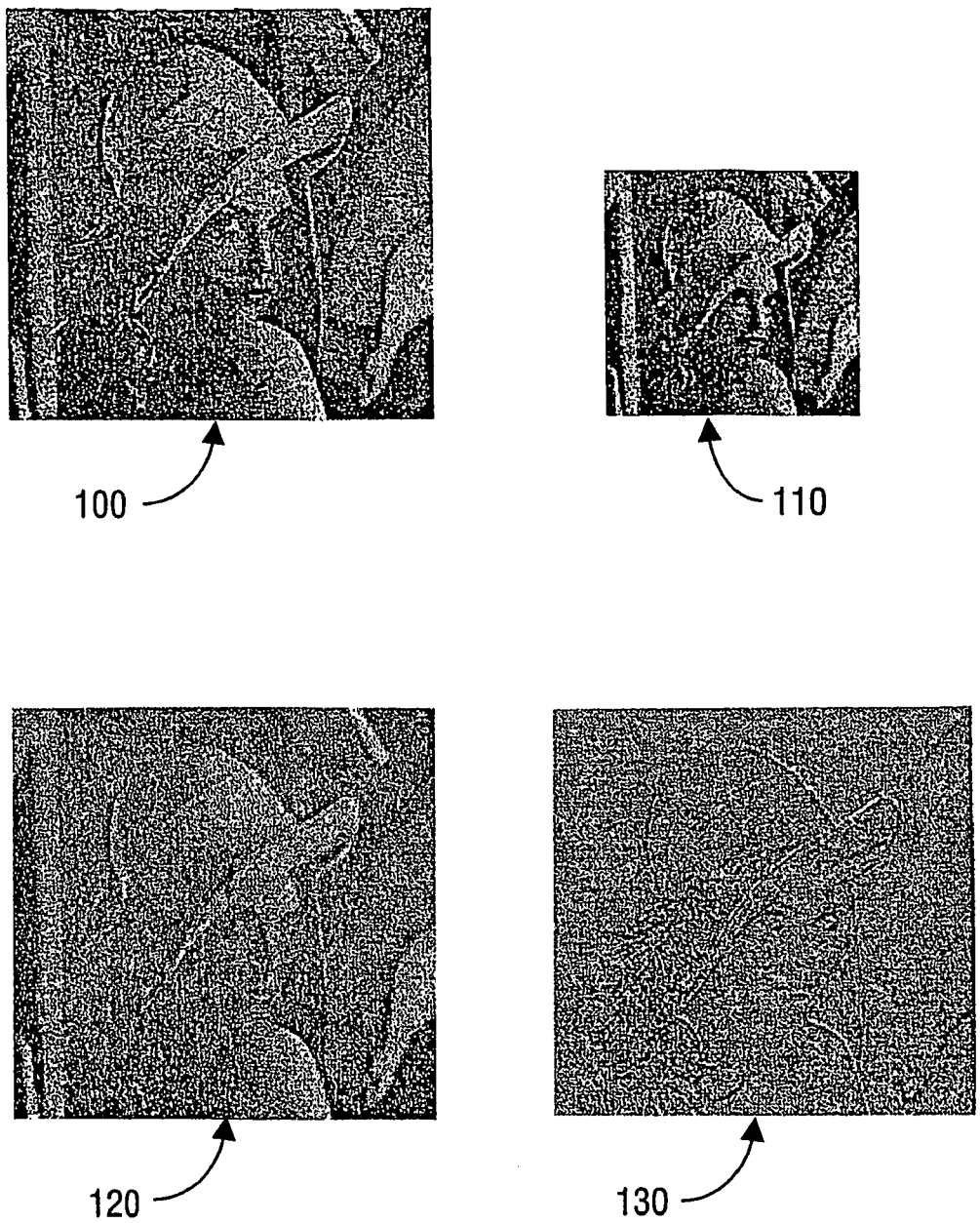
FIG. 2 is a diagram of a group of images subject to encoding in the encoder of FIG. 1.

In FIG. 2, there is shown an example image from a sequence of images provided in the input signal IP, FIG. 2 thereby representing a "snap-shot" situation. An original image presented at the input IP is denoted by 100. An image denoted by 110 corresponds to the image 100 subjected to down-scaling by a factor of ×2 in the scaling-down function 20 and then JPEG encoded in the first encoder 30 followed by corresponding decoding. Moreover, an image denoted by 120 corresponds to the image 110 after it has been subjected to up-scaling in the scaling-up function 50. Furthermore, an image denoted by 130 corresponds to a spatial difference of the image 100, 120, namely equivalent to difference image information provided from the difference function 60 to the second encoder 70; the image 130 is suitable for use in generating an enhancement-layer ELOP signal. With regard to the images of FIG. 2, a 7-tap FIR filter is utilized for image filtering purposes, and 1.5 bits per pixel (bpp) for JPEG encoding.

The inventors have appreciated in particular that not all data present in the enhancement layer, namely in the ELOP signal data, contribute in a similar manner with regard to improving apparent spatial resolution of the base layer, namely in the BLOP signal data, when decoded and reconstituted with the ELOP signal data. Such an assumption has previously been employed in a composite encoder 200 configured as depicted in FIG. 3.

Figure 3:
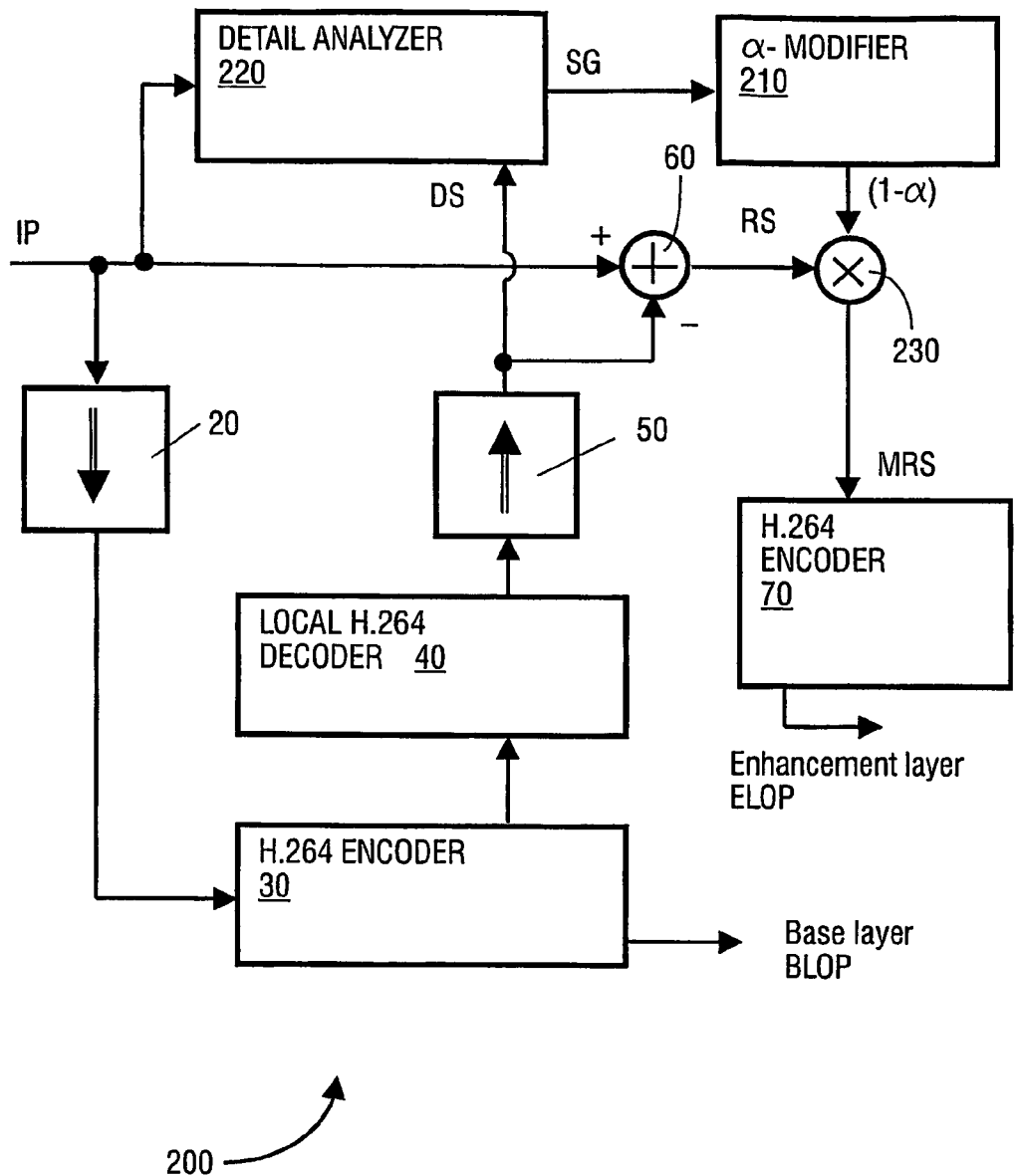
FIG. 3 is a schematic diagram of a composite encoder utilizing multi-layer image encoding wherein an error difference signal is subject to detail analysis for purposes of generating an enhancement layer ELOP data stream.

In FIG. 3, the composite encoder 200 includes component parts of the encoder 10, namely the scaling-down function 20, the first H.264 encoder, the local H.264 decoder 40, the scaling-up function 50, the difference function 60 and the second H.264 encoder 70. The composite encoder 200 additionally comprises an □-modifier 210, a detail analyzer 220 and a multiplier function 230.

Connection topology of the encoder 200 will now be described. The video signal input IP is coupled to the non-inverting input (+) of the difference function, to a first input of the detail analyzer 220 and to the scaling-down function 20. An output of the scaling down function 20 is connected to an input of the first H.264 encoder 30 whose output corresponds to the base layer BLOP output. An auxiliary encoded output of the encoder 30 is coupled via the local H.264 decoder 40 whose output is connected via the scaling-up function 50 to a second input of the detail analyzer 220 and also the inverting input (−) of the difference function 60; the scaling-up function 50 and the scaling-down function 20 are preferably arranged to provide mutually opposing effects. An output SG of the analyzer 220 is coupled to an input of the modifier 210. Moreover, an output (1-□) from the modifier 210 is coupled to a first multiplying input of the multiplying function 230. Furthermore, a summing output of the difference function 60 is connected to a second multiplying input of the multiplying function 230. Finally, a multiply output MRS of the function 230 is coupled to an input of the second H.264 encoder 70 whose output is arranged to provide the enhancement layer ELOP signal.

It will be appreciated that the composite encoder 200 is susceptible to being implemented in a least one of dedicated hardware, in software executing on computer hardware, and in a mixture of software and dedicated hardware.

The composite encoder 200 depicted in FIG. 3 is arranged to function to a major extent in a similar manner to the encoder 10 in FIG. 1, namely:

(a) the input signal IP is propagated through the scaling-down function 20 to the first encoder 30 to generate the encoded base layer BLOP. The first encoder 30 is also operable to provide a signal equivalent to BLOP which is decoded in the local decoder 40 and subject to scaling-up in the scaling-up function 50 to generate a signal DS; and (b) the input signal IP is propagated through the difference function 60 whereat a reconstituted version of the input signal IP subject to encoding and decoding, namely the signal DS, is subtracted from the original signal IP to generate a corresponding residual difference signal RS. The residual signal RS is presented to the multiplier function 230 whereat it is multiplied by a signal (1-□) to generate the modulated difference signal MRS which is subsequently encoded at the second encoder 70 to generate the enhancement layer ELOP.

The detail analyzer 220 is operable to receive the input signal IP and the residual signal DS and to derive therefrom a measure of spatial regions of the images conveyed in the input signal IP where:

(a) inclusion of associated signal information in the enhancement layer ELOP is beneficial to visual perception of the images recreated from signals at the outputs BLOP and ELOP; and also (b) regions of the images in the input IP where information present in the output ELOP are relatively inconsequential to perception of the images regenerated from BLOP and ELOP.

Where the residual signal RS includes image information of relatively high visual significance, the multiplier 230 is operable to reduce attenuation applied to the signal RS so that the encoder 70 correspondingly generates sufficient data at the ELOP output to allow the features of visual significance to be subsequently decoded and reconstituted. Conversely, where the residual signal RS includes image information of low significance, the multiplier 230 is operable to increase attenuation applied to the signal RS so that encoder 70 generates less data. By spatially selective use of the second encoder 70, it is feasible to reduce an amount of data provided at the ELOP output in comparison to the encoder 10 depicted in FIG. 1.

Thus, the detail analyzer 220 generates a numerical value ☐ having associated therewith pixel parameters (x, y, fr#) for each pixel or group of pixels present in incoming images of the input data IP; "x" and "y" are image pixel spatial co-ordinates whereas fr# is colour and/or luminance data indicator. Where there is much detail in the images of the input IP, the value of the value ☐ is low where ☐ is in a range of 0 to 1. Conversely, where there is relatively little detail in the images of the input IP, the value of the value ☐ is high. The multiplier function 230 is thus provided with a multiplying factor (1-☐) which is in a range of 0 to 1.

An effect provided by the composite encoder 200 is to filter regions of the images in the input IP which include relatively little detail. In such regions of relatively little detail, a considerable amount of data for the ELOP output would have been generated in the encoder 10, the regions corresponding in practice to substantially irrelevant little details and noise. Thus, from the viewpoint of image data compression, the composite encoder 200 is an advance on the encoder 10.

The inventors have appreciated that the composite encoder 200 depicted in FIG. 3 is capable of being further improved. In devising such improvement, the inventors have appreciated that even apparently low-detail, noise-like regions in the ELOP output are capable of improving spatial resolution when reconstituted in combination with the corresponding BLOP signal, in other words, even apparently low-detail noise-like regions in the ELOP images can improve spatial resolution of corresponding images in the BLOP output. Moreover, the inventors have appreciated that exact pixel values are often not a major concern in spatial noise-like regions, but the overall contribution of these regions when reconstructing images from the ELOP and BLOP outputs is perceptually important. Hence, in contradistinction to the encoder 200 wherein noise-like components are irreversibly filtered out and do not appear in the ELOP output, the inventors propose to model such noise-like regions and send corresponding model parameters to an enabled decoder; the enabled decoder is then capable of applying the model parameters to a synthesizer to synthesize an approximation of the original noise-like data. Such an approach devised by the inventors is capable of not only preserving more decoded image spatial resolution in comparison to decoded images derived from the encoders 10, 200, but also capable of reducing bit-rate in BLOP and ELOP outputs correspondingly generated providing that coding of fewer model parameters in the approach is more efficient than coding corresponding original image data described by the model parameters. In the approach, the inventors have appreciated that exclusion of data parts of the signal IP from full encoding and conveying model data corresponding to the excluded parts can be implemented in practice by utilizing conventional macro-block skipping procedures.

Figure 4:
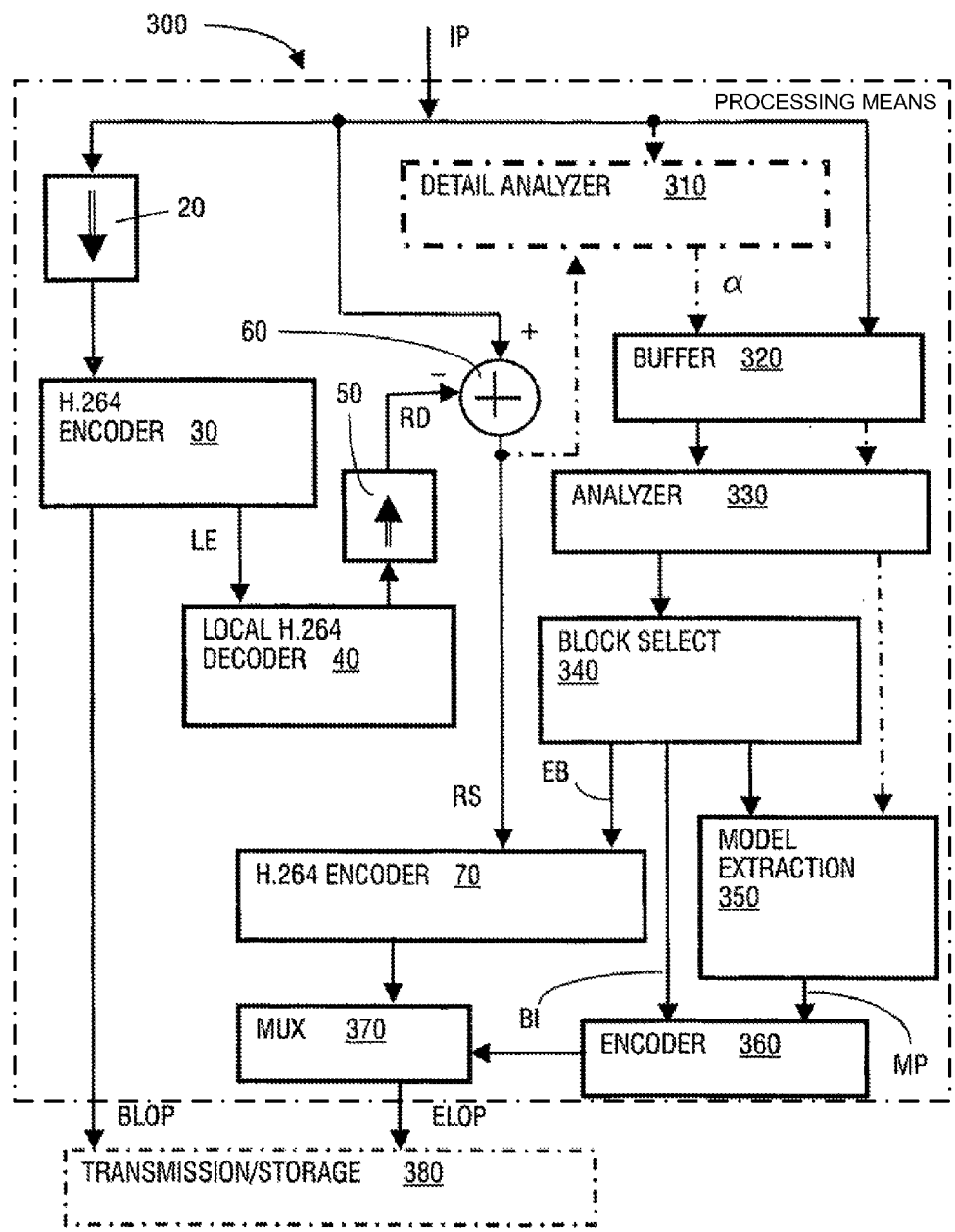
FIG. 4 is a schematic diagram of a composite encoder according to the invention, the encoder utilizing model parameter data to represent one or more selected macroblocks in enhancement layer ELOP data generated by the encoder.

In FIG. 4, there is provided a schematic diagram of a composite encoder according to the invention; the encoder is indicated generally by 300. The encoder 300 comprises the scaling-down function 20, the first H.264 encoder 30, the local H.264 decoder 40, the scaling-up function 50, the difference function 60 and the second encoder 70, for example as employed in the aforementioned composite encoders 10, 200. The composite encoder 300 is distinguished from the afore-mentioned composite encoders 10, 200 is that the encoder 300 includes a detail analyzer 310, a buffer 320, an analyzer 330, a block select function 340, a model extraction function 350, an encoder 360 and finally a multiplexer 370. In FIG. 4, items shown in dashed outline, namely the detail analyzer 310, can be optionally omitted. BLOP and ELOP image data generated by the composite encoder 300 is coupled to a transmission/storage medium 380. The medium 380 is preferably at least one of a communication network such as the Internet, a CD, a DVD, an optical fibre network and a wireless transmission network such as used for mobile telephones.

Operation of the composite encoder 300 will now be described in overview with reference to FIG. 4.

The input signal IP corresponding to a sequence of digital pixel images is conveyed to the scaling-down function 20 which scales the images, for example in a manner as illustrated in FIG. 2, and then feeds them to the first H.264 encoder 30 which processes the images to generate corresponding encoded data in the form of the BLOP output. Moreover, an auxiliary encoded output LE from the encoder 30 is passed through the scaling-up function 50 to provide a reconstituted signal RD for input to the inverting input of the difference function 60. The signal RD corresponds to the signal IP, except that the signal RD includes encoding errors arising within the first encoder 30 and corresponding error arising in the local decoder 40. Preferably, the scaling-down function 20 and the scaling-up function 50 are arranged to provide mutually identical but mutually inverse characteristics when the encoder 30 and its local decoder 40 are arranged to provide substantially mutually complementary characteristics. The signal RD and the input signal IP are mutually subtracted at the difference function 60 to generate a residual signal RS which is conveyed to an input of the second H.264 encoder 70 for encoding therein. Moreover, the second encoder 70 is operable to generate corresponding encoded data which is selectively transmitted through the multiplexer 370 to generate the enhancement layer ELOP output in a manner which will be elucidated in further detail later. The BLOP and ELOP outputs are conveyed to the transmission/storage medium 380.

The buffer 320, for example operable in a manner corresponding to a FIFO, is arranged to receive sequences of images present in the input IP and store them to feed into the analyzer 330. Subsequently, the analyzer 330 is operable to receive image data from the buffer 320 and to analyze the data to determine regions thereof which are susceptible to having their ELOP residual data implemented by way of a parameter model; these regions shall hereinafter also be referred to as "image blocks". When the analyzer 330 determines that use of a parameter model is inappropriate, the block select function 340 communicates to the second encoder 70 that it should encode the signal RS in a normal manner, for example as occurs in the composite encoder 200. Conversely, when the analyzer 330 determines that the signal RS includes one or more image blocks which are susceptible to being represented by a parameter model, the block select function 340 disables the second encoder 70 by way of an enable block EB signal and causes the model extraction function 350 to process the one or more selected blocks and calculate corresponding model parameters MP. Moreover, the block select function 340 also passes a corresponding block index BI to the encoder 360 so that the encoder 360 not only receives the model parameters MP from the extraction function 350 but also an indication of the corresponding block from the select function 340. In substitution for the second encoder 70, the encoder 360 outputs model parameters corresponding to the selected blocks to the ELOP output. Thus, the composite encoder 300 functions in a similar manner to the composite encoder 10 except when one or more image blocks are identified in the input signal IP which are susceptible to having their residual image represented by model parameters in which case model parameters are inserted in the ELOP output instead of equivalent encoded data from the second encoder 70. The detail analyzer 310 is optionally incorporated into the encoder 300 for use in pre-selecting suitable image blocks suitable for being represented by model parameters in the ELOP output; the detail analyzer 310 is provided with input data from at least one of the difference function 60 and input signal IP as illustrated. The analyzer 310 is operable to provide an output □ indicative of enhancement layer image density.

The composite encoder 300 is preferably implemented in at least one of hardware, software executing on computing hardware and a mixture of software and hardware.

The composite encoder 300 will now be elucidated in further detail.

The buffer 320 is capable of providing a benefit that images present in the signal IP are susceptible to being analyzed both spatially and temporally, namely across several images in a sequence. Moreover, the model extraction function 350 is beneficially based on statistical and spectral analysis which will be elucidated in more detail later. The block select function 340 provides the control signal EB to the second encoder 70 which empties memory locations therein corresponding to image blocks selected for parameter modelling; such emptying occurs through so-called skip macro-block code. The block co-ordinates and model parameters are encoded by the encoder 360 which preferably employs fixed length coding (FLC), for example at least one of Pulse Code Modulation (PCM) and Natural Binary Coding; alternatively, or additionally, Variable Length Coding (VLC) is susceptible to being employed, for example Huffman Coding and/or Arithmetic Coding. Preferably, coded model parameters can multiplexed as private data with a standard bit stream arrangement provided from the second encoder 70 at a high transport level, or internally in the second encoder 70 itself, for example by way of utilizing contemporary "reserved SEI messages"; SEI is here an abbreviation for "Supplemental Enhancement Information" as accommodated in the H.264/AVC standard, since SEI messages are well specified parts of H.264/AVC syntax.

Figure 5:
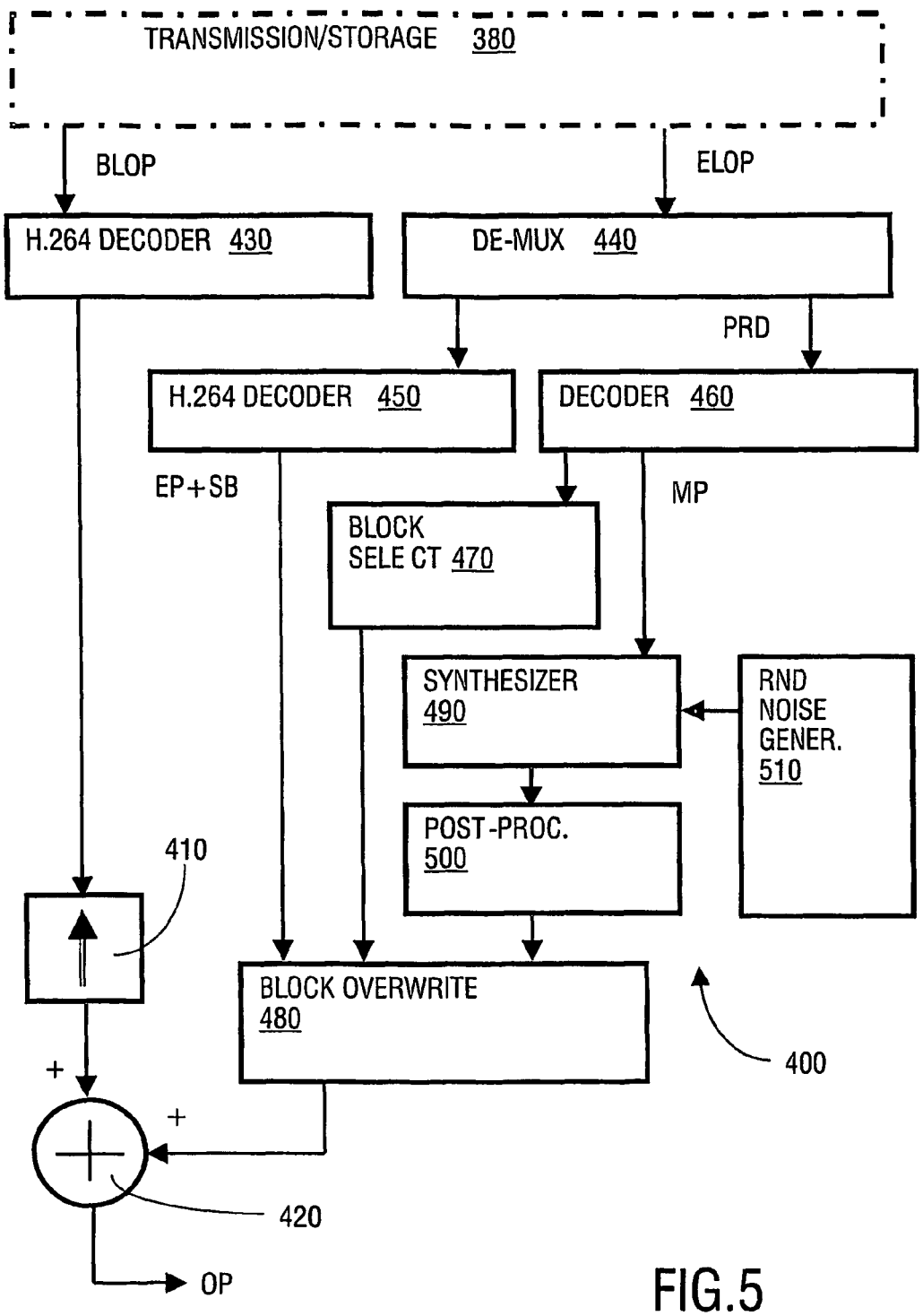
FIG. 5 is a corresponding decoder according to the invention to complement the encoder of FIG. 4.

The encoder 300 illustrated in FIG. 4 is complemented by a corresponding decoder as illustrated in FIG. 5.

In FIG. 5, the decoder is indicated generally by 400. The decoder 400 comprises a primary signal processing path for receiving BLOP image layer data from the transmission/storage medium 380, the primary path comprising in sequence an H.264 decoder 430 arranged to complement the first encoder 30 of the composite encoder 300, a scaling-up function 410 arranged to complement the scaling-down function 20 of the composite encoder 300, and a summing function 420 whose output OP provides a final decoded output from the decoder 400.

In parallel with the primary path, there is provided in the decoder 400 a secondary path for ELOP image layer data. The secondary path comprises a demultiplexer 440 providing an input for receiving the ELOP data, a first output coupled to an H.264 decoder 450 and second output PRD denoting "private data" coupled to a decoder 460 operable to decode aforementioned parameter model data. An output EP+SB, namely "enhanced pictures and skipped macroblocks", is coupled from the H.264 decoder 450 to a block overwrite function 480 whose output is coupled to the summing function 420 as illustrated. The decoder 460 comprises a first output coupled to a block select function 470 whose output is coupled in turn to the block overwrite function 480 as illustrated. The block overwrite function 480 includes an output which is connected to a summing input of the summing function 420. Furthermore, the decoder 460 includes a second output MP, namely "model parameters", connected to a macroblock synthesizer 490 arranged to receive noise input data from a random noise generator 510. A simulated noise output from the synthesizer 490 is coupled via a post-processing function 500 to an input of the block overwrite function 480. The post-processing function 500 includes features such as macroblock clipping but is also susceptible to including other types of image editing functions.

Operation of the decoder 400 will now be described in overview with reference to FIG. 5.

Layer image data, namely BLOP and corresponding ELOP data, from the composite encoder 300 of FIG. 4 is coupled via the medium 380 to the decoder 430 and the demultiplexer 440 as illustrated. BLOP layer image data is decoded in the decoded 430 and is passed to the scaling-up function 410 which scales up the decoded BLOP data to provide BLOP layer output data to the summing function 420 for subsequent output at OP. The ELOP data is received at the de-multiplexer 440 and is selectively directed to the decoder 450 where macroblock parameter modelling has not been implemented at the encoder 300. Conversely, where the encoder 300 has been able to implement parameter modelling of selected macroblocks, corresponding parameters are encoded into private data areas of the ELOP data conveyed via the transmission/storage medium 380. The demultiplexer 440 extracts the private data, namely "PRD", from the ELOP data and passes this PRD to the decoder 460 which is operable to generate corresponding model parameters MP from the PRD. The model parameters MP are passed to the synthesizer 490 functioning in tandem with the noise generator 510 which are operable to recreate noise-like structures of macroblocks identified and encoded in the encoder 300 as described in the foregoing. A synthesized output corresponding to the selected encoded macroblocks passes via the post-processing function 500 to the block overwrite function 480 which is operable to utilize synthesized output received from the post-processing function 500 is preference to output from the decoder 450 for macroblocks selected by the encoder 300. The summing function 420 combined decoded output corresponding to the BLOP and ELOP data to generate the reconstituted image output OP suitable for final viewing.

Operation of the encoder 300 and decoder 400 will now be described in more detail.

Figure 6:
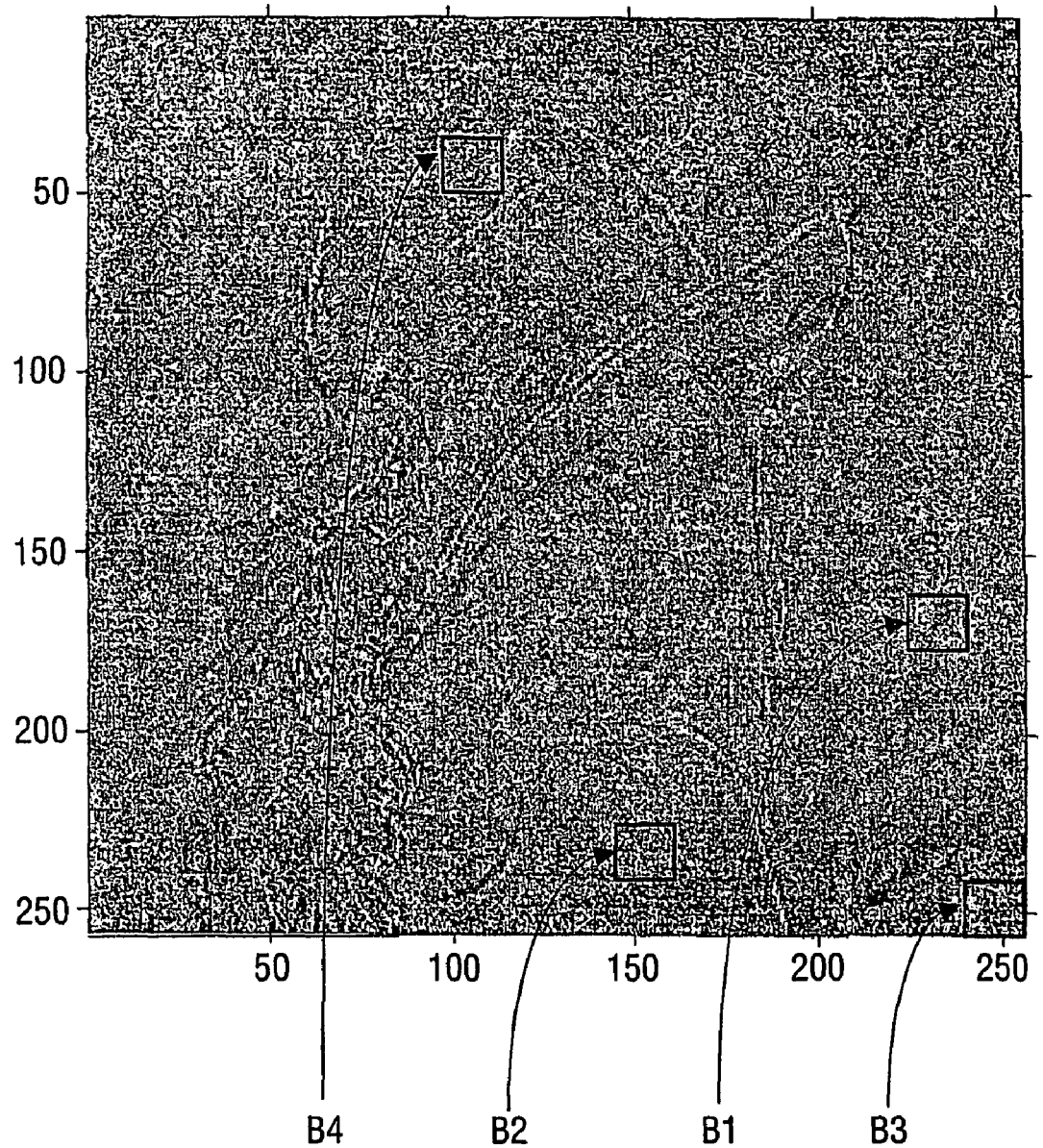
FIG. 6 is an example enhancement layer ELOP image with selected macroblocks B1 to B4 marked thereon.
Figure 7:
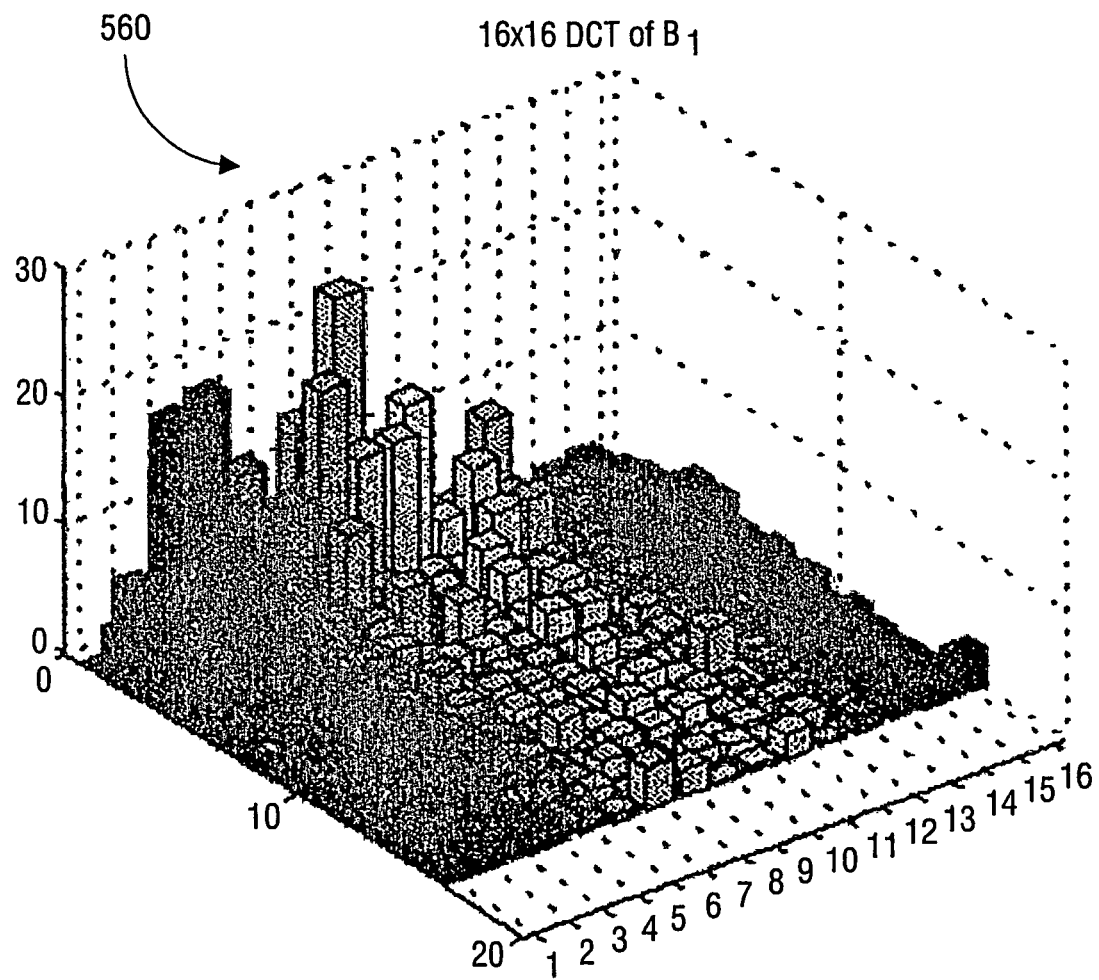
FIGS. 7 to 10 are Discrete Cosine Transforms (DCT) of the macroblocks B1 to B4 of FIG. 6.
Figure 8:
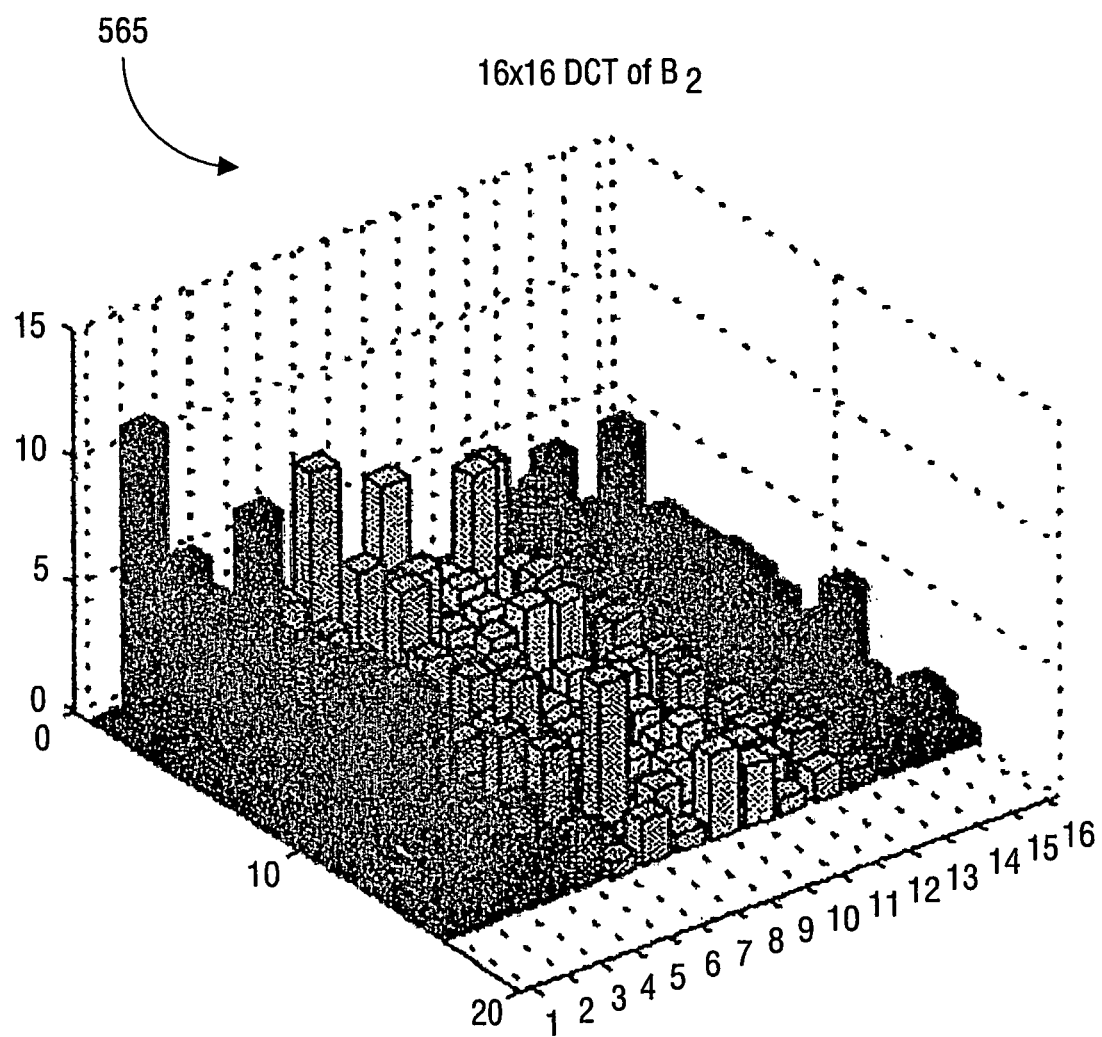
Figure 9:
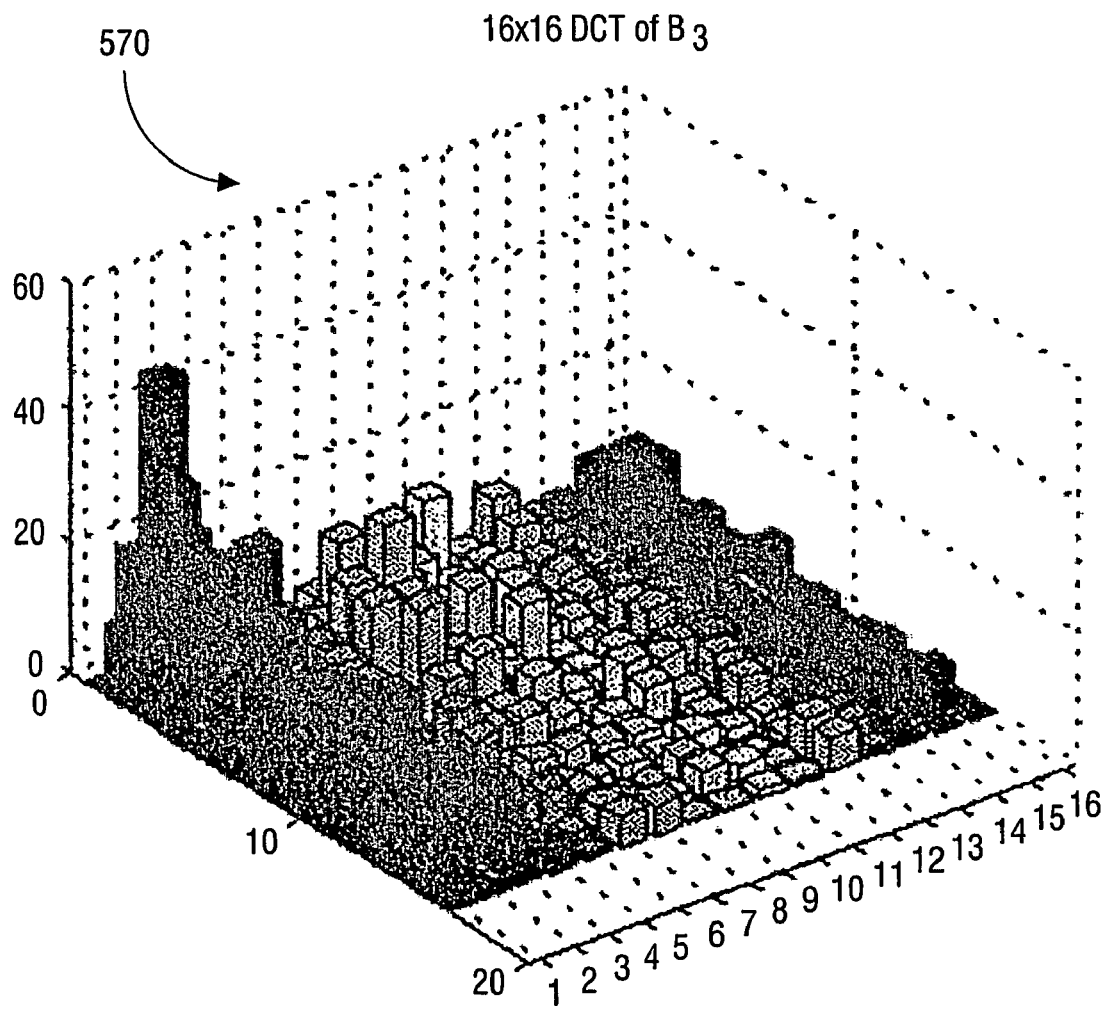
Figure 10:
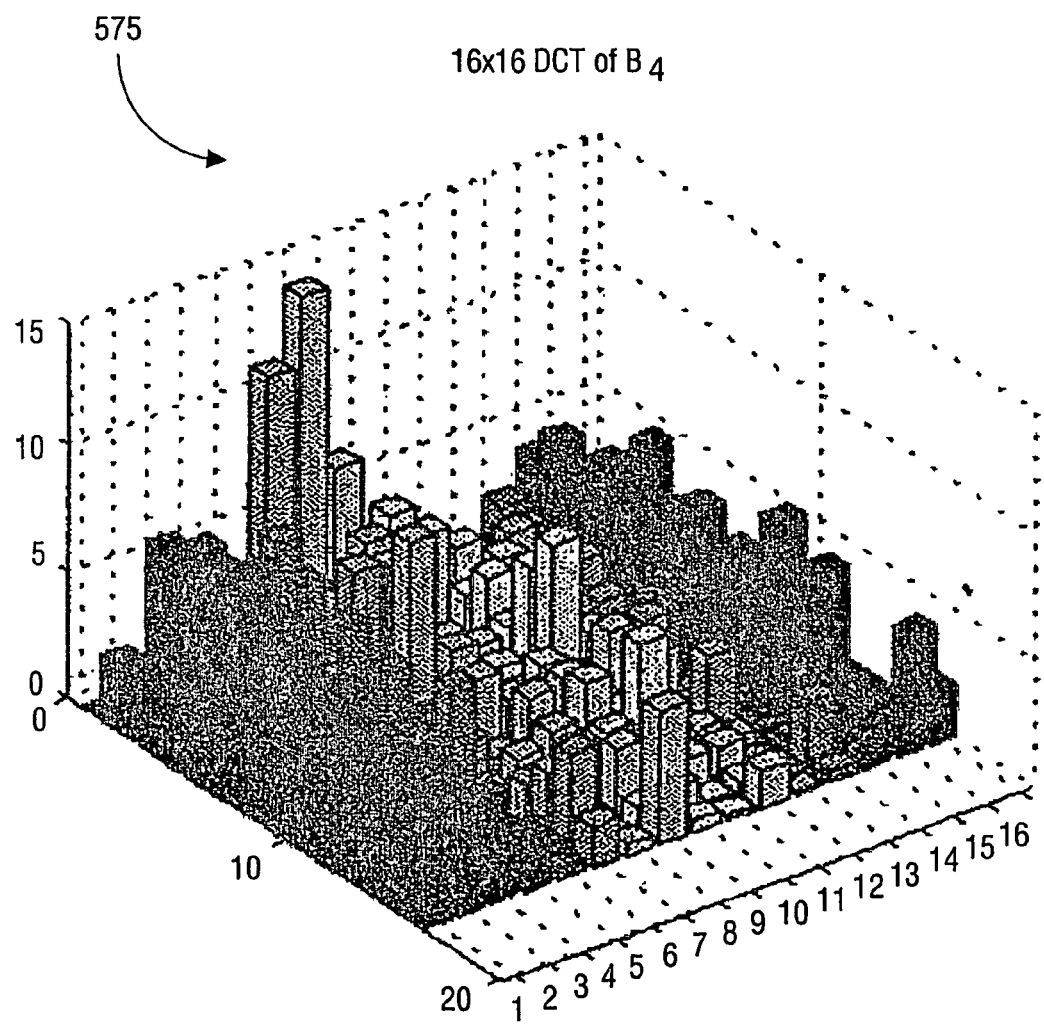

The analyzer 330 of the composite encoder 300 of FIG. 4 is operable to distinguish between noise-like and texture-like structures in the enhancement layer information after BLOP-type image information has been subtracted, or to redefine such a distinction if already executed by the detail analyzing function 310 when optionally included. In operation, the analyzer 330 performs a discrete cosine transformation, namely a "DCT", of macroblocks identified for transformation to corresponding model parameters. The DCT generates information about a spectral energy distribution within each selected block of images in the input IP for parameter modelling, such spectral energy distributions being appropriate to use for categorizing various types of texture and noise-like structures present in the images. Examples of DCT analysis are illustrated in FIGS. 6 to 10, wherein DCT analyses for macroblocks B1, B2, B3, B4 selected by the analyzer 330 are indicated generally by 560, 565, 570, 575 respectively. In FIG. 6, there is shown an enhancement layer image of the portrait image shown in FIG. 2. In the enhancement layer image of FIG. 6, spatial locations of the macroblocks B1 to B4 are shown; each block comprises a field of 16×16 pixels. The macroblock B2 is distinguished to be a low-detail noise-like block, whereas the macroblocks B1, B3, B4 include more texture-like detail; the macroblocks B1 to B4 are all susceptible to being modelled and thereby being represented by corresponding model parameters. For example, the macroblock B1 includes a clear vertical edge, whereas the blocks B3 and especially B4 are more spatially uniform than the block B1. On closer analysis, the block B3 includes spatially gradually changing diagonal texture whereas the macroblock B4 includes highly detailed spatially irregular texture. Thus, the macroblock B4 gives rise to a more peaked DCT characteristic whereas the block B3 has a relatively uniform DCT characteristic. Moreover, the DCTs of the macroblocks B1, B3 include several dominant coefficients shown in FIGS. 7 and 9 to be disposed in specific directions, namely substantially horizontally for the macroblock B1 and substantially diagonally for the macroblock B3.

It will be appreciated that although DCT's are susceptible to being used to model selected macroblocks in the ELOP image layer, other methods can additionally or alternatively be utilized. Such other methods are preferably arranged not only to process data within each selected macroblock but also from pixels in regions surrounding such macroblocks, for example by utilizing 2-dimensional (2-D) cross-correlation. Moreover, various properties of each selected macroblock are susceptible to temporal analysis from image to image in a sequence of images presented to the analyzer 330. For example, an analysis of time-consistency of certain DCT characteristics is potentially susceptible to being used for distinguishing spatial image detail from temporal noise. As a further example, operation of the analyzer 330 preferably also involves coding parameters and content analysis decisions available from H264 encoding within the composite encoder 300.

It will be appreciated from FIGS. 7 to 10 that translation of macroblocks in the ELOP image data selected by the analyzer 330 to corresponding DCT potentially results in a comparable quantity of data being generated; in other words, applying DCT to selected macroblocks does not potentially result itself in data compression. The inventors have appreciated that parametric modelling is beneficially applied to the DCT parameters, for example as illustrated graphically in FIGS. 7 to 10, to provide data compression in the ELOP data provided from the composite encoder 300.

There are several known methods of 2-D spectral modelling, for example auto-regressive (AR) modelling. Moreover, Maximum Likelihood and Maximum Entropy Methods are described in a publication "Two-Dimensional Signal Processing" by Jae S. Lim published by Prentice Hall, 1990. For providing parametric modelling of selected macroblocks, the inventors preferentially employ Auto-Regression (AR). In particular, the inventors prefer to utilize a 1-dimensional (1-D) representation of a 2-D block of values which is found in practice to function well and will herewith therefore be elucidated in greater detail; thus, the 2-D DCT graphs of FIGS. 7 to 10 are susceptible to being represented in 1-D.

Figure 11:
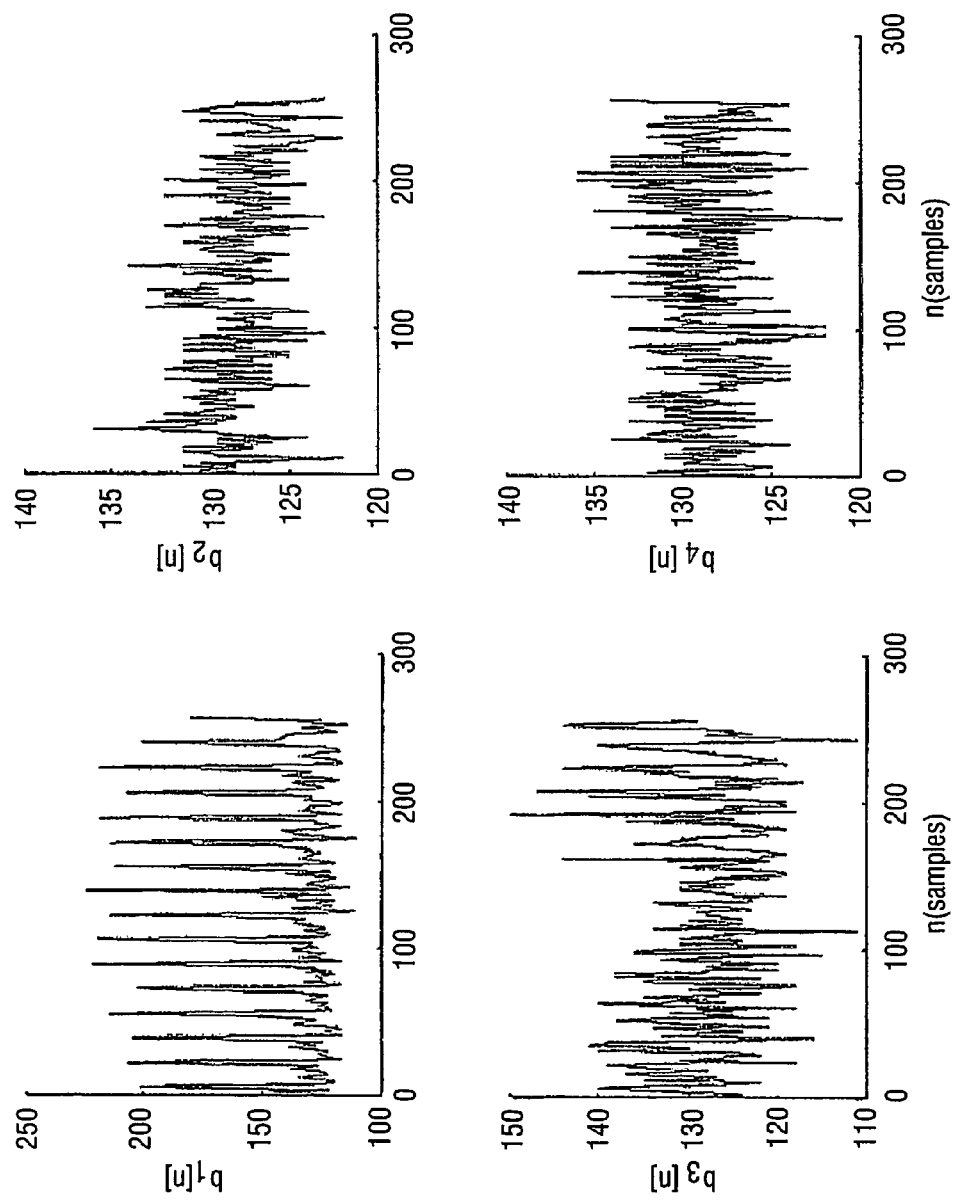
FIG. 11 is a set of graphs of 2-D to 1-D data concatenation pertaining to the macroblocks B1 to B4 of FIG. 6.

A first step in generating a 1-D representation of a 2-D block of data, for example as illustrated in FIGS. 7 to 10, is by concatenating block columns or rows in a fixed or random order. Results of such 2-D to 1-D conversion in respect of FIG. 7 to 10 are illustrated in FIG. 11 wherein the deterministic nature of the macroblocks B1 and B3 are contrasted with the more relatively random nature of the macroblocks B2 and B4. In FIG. 11, coefficients b3 are generated by concatenating columns corresponding to the macroblock B3 whereas coefficients b1, b2 and b4 are generated by concatenating rows of macroblocks B1, B2 and B4 respectively.

Application of a 1-D AR model to aforementioned selected macroblocks assumes that data to be represented by corresponding model parameters have been generated by a system whose properties are described by Equation 1 (Eq. 1):

$$x[n] = -\sum_{k=1}^{P} a_k x[n-k] + e[n] \quad \text{Eq. 1}$$

wherein
x[n]=an observed output of the system;
e[n]=an unobserved input to the system; and
ak's=coefficients describing the system.

For the purpose of applying Equation 1 with regard to the input e[n] in the analyzer 330, a power spectral density (PSD) function Pxx(f) of x[n] is susceptible to being computed as determined by Equation 2 (Eq. 2) where a parameter f is used to represent frequency. The PSD function can be determined by estimating the AR coefficients ak and an associated noise variance denoted by □2. Several methods are capable of being employed of estimating the AR coefficients ak, for example at least one of a Yule-Walker method, a covariance method and a Burg method as described in "The Digital Signal Processing Handbook" by Vijay Madisetti, Douglas Williams, published by CRC Press, Florida, 1998.

$$P_{xx}(f) = \frac{\sigma^2}{\left|1 + \sum_{k=1}^{P} a_k e^{-j2\pi f k}\right|^2} \quad \text{Eq. 2}$$

Figure 12:
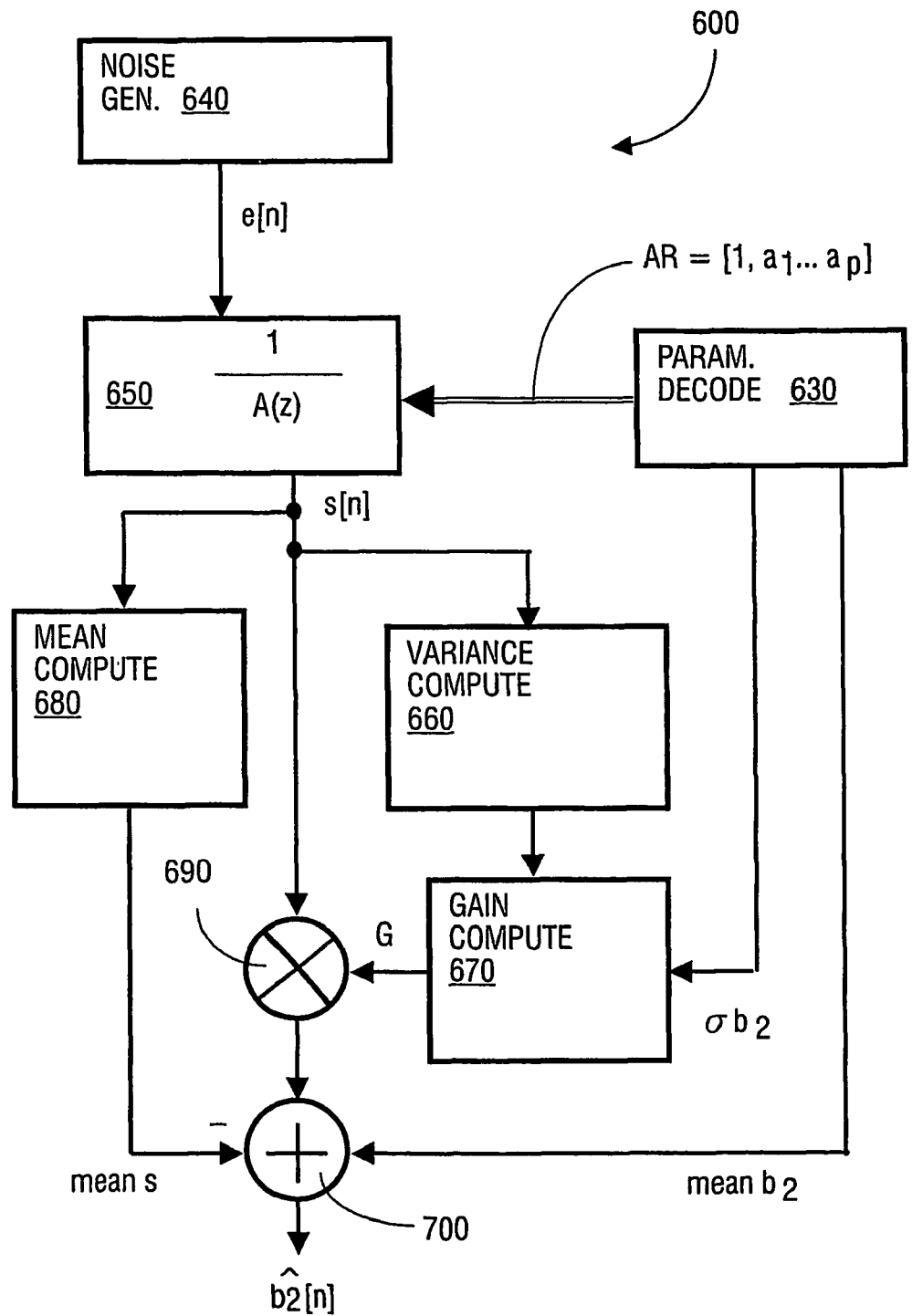
FIG. 12 is a schematic diagram of a noise synthesizer for use in the invention.
Figure 13:
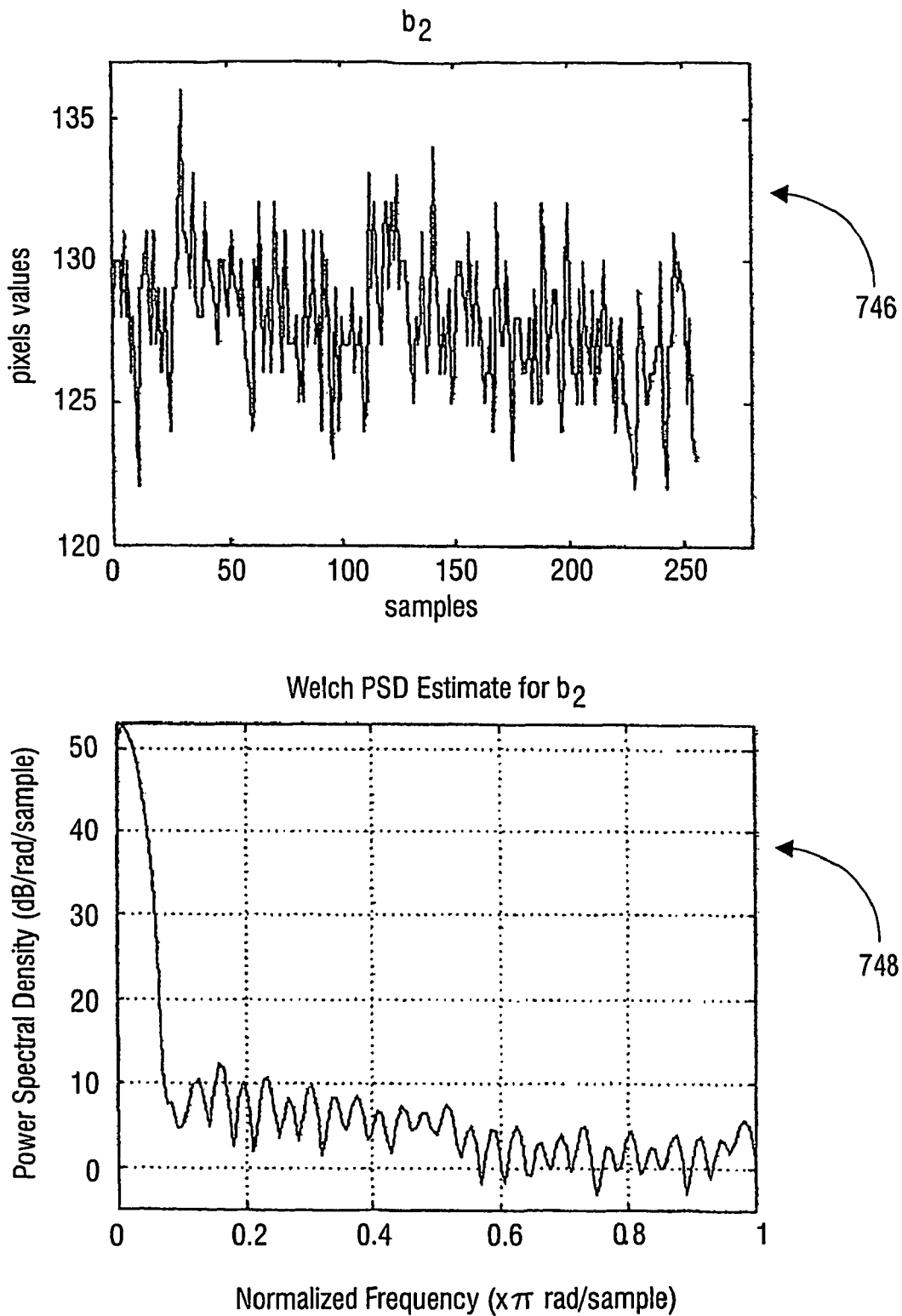
FIGS. 13 and 14 are illustration of synthesis of noise-like signals for the selected macroblock B2.
Figure 14:
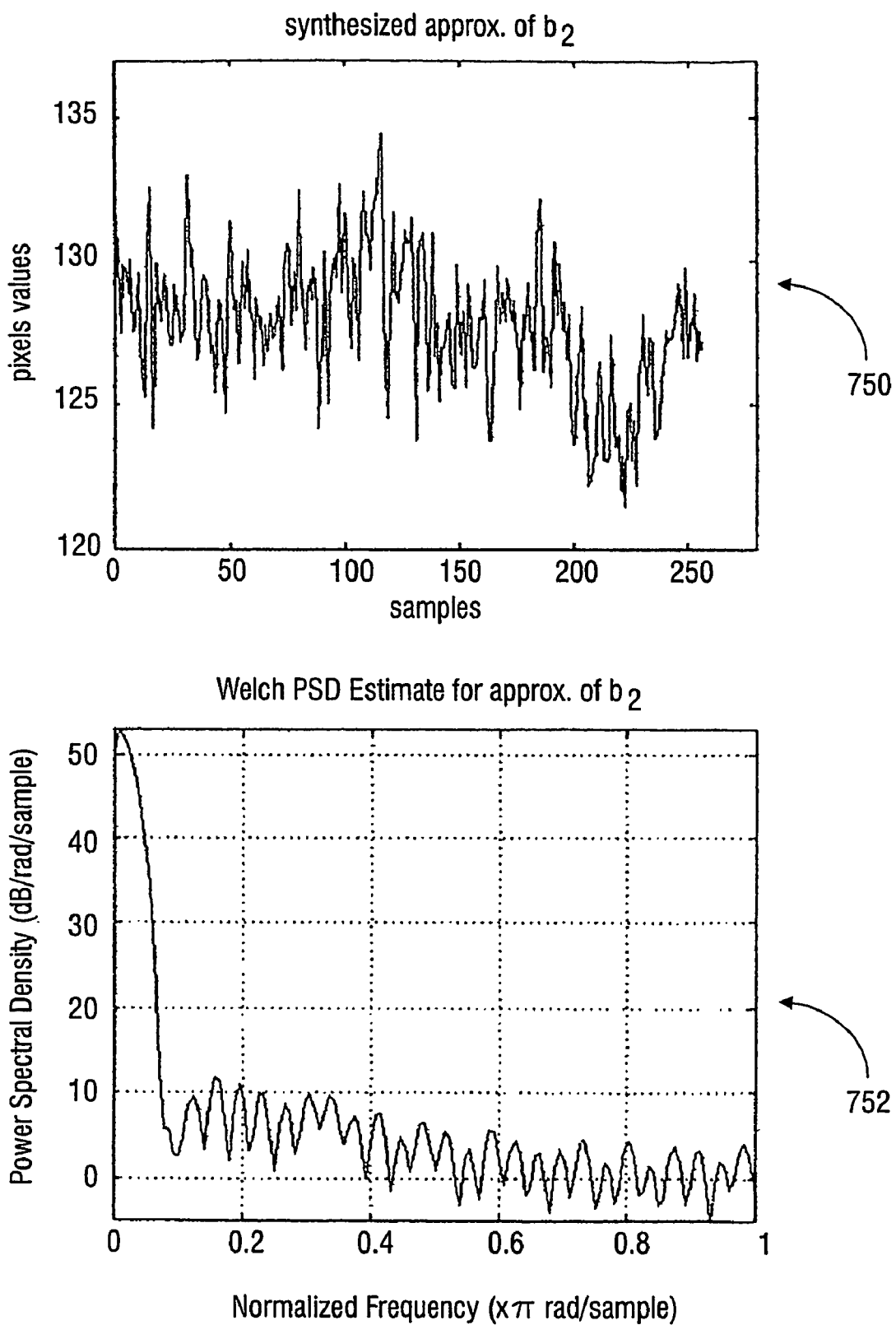

In generating results presented in FIGS. 13, 14, the inventors have employed a synthesizer as indicated generally by 600 in FIG. 12. For example, for a 256 sample data set for b2[n] presented in FIG. 8, the inventors have selected parameter P=12 and have employed a covariance method for estimation. The synthesizer 600 is operable to generate a synthesis of b2[n]. Estimated AR coefficients are used in the synthesizer 600 as coefficients for a filter which is operable to shape 256 samples of a zero-mean normally-distributed noise process, namely a process having a statistic characteristic such that □=1. The synthesizer 600 generates a synthesis s[n] of, for example, b2[n] such that s[n] has a mean and a variance which are substantially an exact match to those of b2[n] as described by Equation 3 (Eq. 3) where a parameter G corresponds to gain:

$$G = \frac{\sigma_{b2}}{\sigma_s} = \sqrt{\frac{\text{var}(b_2)}{\text{var}(s)}} \quad \text{Eq. 3}$$

The synthesizer 600 is susceptible to being used to implement the synthesizer 490 and its associated noise generator in the decoder 400 illustrated in FIG. 5.

In FIG. 12, the synthesizer 600 comprises a parameter decoder 630, a noise generator 640, a parametrically-driven shaping filter 650, a variance computing function 660 coupled and an associated gain computing function 670, a mean computing function 680, and finally a multiplying function 690 and its associated difference function 700. It will be appreciated that the synthesizer 600 is capable of being implemented in hardware, in software executable on computer apparatus and/or a mixture of software and hardware.

The noise generator 640 includes an output e[n] coupled to an input of the shaping filter 650; the filter 650 is also connected to the decoder 630 to receive AR coefficients therefrom. Moreover, the shaping filter 650 comprises an output s[n] coupled to a first input of the multiplier function 690 and to respective inputs of the mean computing function 680 and the variance computing function 660. A second input of the multiplying function 690 denoted by "G" is connected to an output of the gain computing function 670. This function 670 is arranged to receive inputs from the variance computing function 660 and the parameter decoding decoder 630 as illustrated. A multiplication output from the function 690 is coupled to a first input of the difference function 700. The difference function 700 includes a subtraction input whereat the mean computing function 680 is operable to provide a variance means "mean s"; moreover, the function 700 also includes an addition input for receiving an output from the decoder 630 corresponding to a mean of the parameters b2, namely "mean b2".

Operation of the synthesizer 600 will now be described in overview. The noise generator 640 generates a noise-like data set for e[n] which is passed to the filter 650. The filter 650 receives AR coefficients from the decoder 630 and filters corresponding components of the data set e[n] to generate the output s[n]. The output s[n] passes to the mean computing function 680 which generates its corresponding mean "means s" which is passed to the difference function 700 which is operable to subtract this mean and thereby ensure that the output b^2[n] has a mean of substantially zero. The variance computing function 660 is operable to determine s[n]'s variance and pass this variance to the gain computing function 670. The gain computing function 670 receives a desired variance □b2 from the decoder 630 and accordingly adjusts the gain G so that the output {G.s[n]} provided from the multiplier function 690 has a desired variance as dictated by the decoder 630. Finally, the decoder 630 provides its output "mean b2" for adjusting a mean of the output b^2[n] from the difference function 700.

The synthesizer 600 is capable of simulating parameters b[n] as demonstrated in FIGS. 13 and 14. A first graph indicated by 746 includes an abscissa axis and an ordinate axis corresponding respectively to DCT sample pixel index and pixel value with regard to aforementioned parameter b2. For comparison purposes, a graph indicated by 748 is a power spectral density against normalised spatial frequency corresponding to the graph 746.

Figure 15:
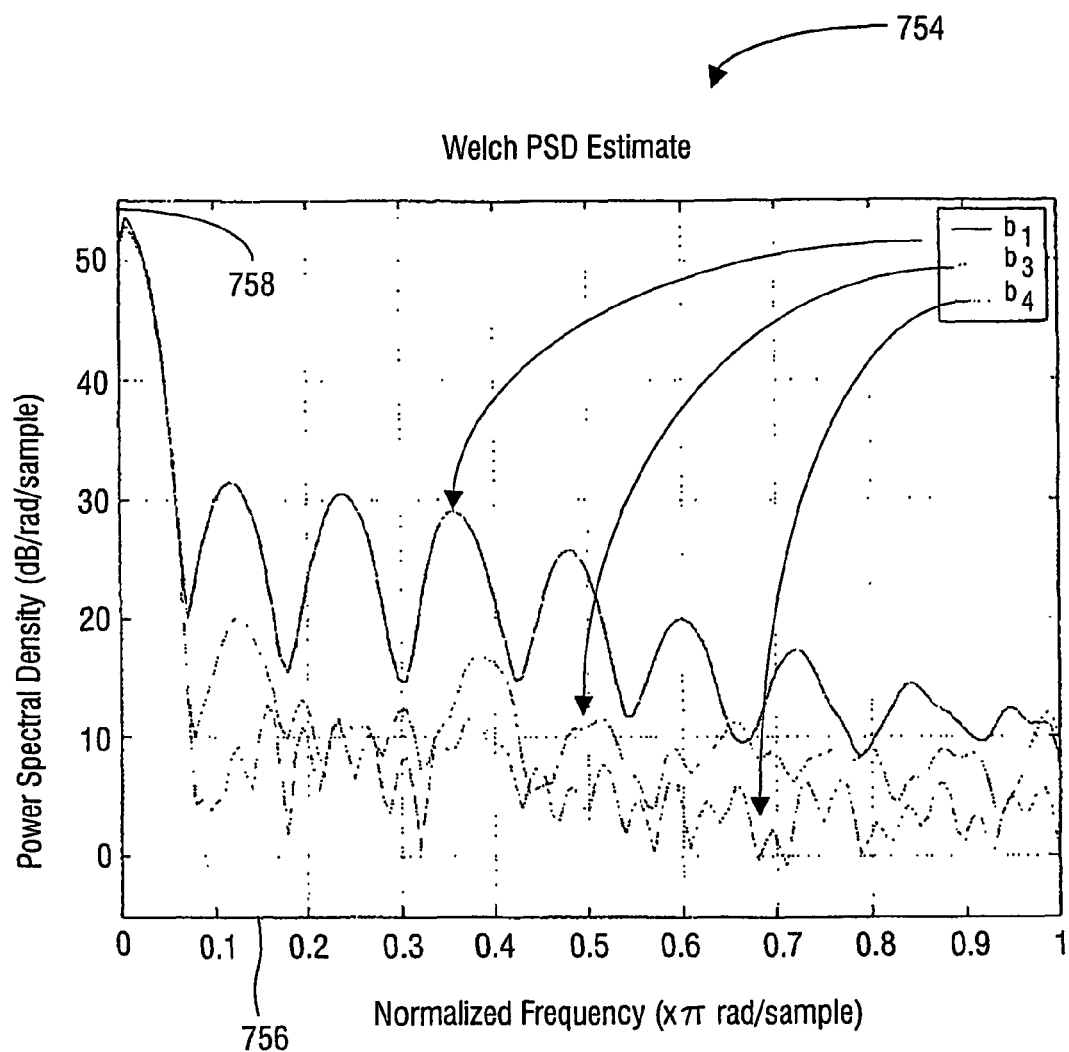
FIG. 15 is a Power Spectral Density (PSD) comparison relating to selective macroblocks B1, B3 and B4.

Content of the graph 746 is capable of being synthesized by the synthesizer 600 to generate equivalent data in a graph indicated by 750; a corresponding power spectral density graph is indicated generally by 752. Thus, the original graphs 746, 748 are to be compared with the synthesized graphs 750, 752 respectively. Although not perfectly identical, it will be appreciated that the synthesizer 600 is capable of generating a resemblance from concise model parameter data fed to it. As a further example, in FIG. 15, there is provided a graph indicated generally by 754 including an abscissa axis 756 for normalised spatial frequency and an ordinate axis 758 power spectral density (PSD). The graph 754 illustrates PSD estimates for the parameters b1, b3, b4, the graph 754 showing variations between different selected ELOP-layer macroblocks of images presented to the encoder 300 of FIG. 4.

As elucidated in the foregoing, the encoder 300 and corresponding decoder 400 are susceptible to substantially maintaining image quality and detail in comparison to the known encoder 10 whilst providing enhanced data compression in data output from the encoder 300; such data compression arises, as elucidated in the foregoing, by representing one or more selected macroblocks in the ELOP enhanced layer by model parameters, such parameters being derived by DCT and subsequent 2-D to 1-D concatenation of generated DCT coefficients, such concatenation giving rise to the aforementioned AR coefficients susceptible of being communicated with ELOP-layer data in private data fields thereof. In order to estimate a degree of data compression achievable using the encoder 300, it is necessary to take into account statistics associated with the model parameters used.

It will be appreciated that embodiments of the invention described in the foregoing are susceptible to being modified without departing from the scope of the invention; the following Claims are to be interpreted accordingly.

The inventors have appreciated that selection of a suitable number of model parameters to employ, for example as in the model extraction function 350 of the encoder 300, has a profound influence on a degree of data compression obtainable from the encoder 300; the number of model parameters used will hereinafter also be referred to as the "model order", In the encoder 300, the model order can be made dynamically variable. Alternatively, the model order can be set a preferred compromise value. An accurate procedure that can be employed in the model extraction function 350 is to estimate parameter values in increasing order and to determine an optimal compromise such that increase in model order does not give to a corresponding increase in perceived image quality from the decoder 400. However, such an approach to determine an optimum model order is computationally demanding.

Thus, the inventors have appreciated that it is computationally more beneficial to calculate the fit of a limited number of sets of model parameters for different model orders and then use the properties of a fit criterion to determine an optimal model order. Such a preferred approach circumvents a need to generate laboriously an entire sequence of model parameter sets and check encoding quality for each set. More preferably, statistical analysis is applied in the model extraction function 350 and used to determine a quality of fit to be used, for example, for image reconstruction purposes. In this application, for example, the interpolation is advantageously driven by a difference in noise components between an original version of an image and a reconstituted image for given model orders on account of noise components being able to yield considerable information for interpolation purposes.

In order to elucidate further such selection of model order based on noise statistics, a graph indicated generally by 800 in FIG. 16 will now be described. The graph 800 includes an abscissa axis 810 denoting model order P and an ordinate axis 820 denoting a fit function F(P) having the model order P as one of its arguments and expressing the difference between the model and the data. The fit function F(P) is implemented as a part of the model extraction function 350 and is indicative of a quality of statistical fit of model parameters to corresponding selected macroblocks in the ELOP enhance layer. The graph 800 illustrates an iterative selection of an optimal model order P based on a Generalized Information Criterion (GIC) as described in "Automatic Spectral Analysis with Time Series Models" by P. M. T. Broersen, IEEE Transactions on Instrumentation and Measurement, 51(2): pp. 211-216, April 2002; a typical fit is denoted by a dashed line 830 and threshold values of GIC are denoted by 840. A typical form for GIC is provided in Equation 4 (Eq. 4):

$$GIC(P) = F(P) + 3P \qquad \text{Eq. 4}$$

where 3P stands for a penalty Q(P). Different choices for the penalty are described in the literature. Here the penalty 3P is used because it yields an optimal trade-off of underfit and overfit. The penalty can more generally be described as a function of P. Q(P) is a known function which does not depend on M(P) or the data but that increases with P and is easily calculated. In the example, the particular penalty function denoted 3P contains a penalty factor that occurs when the penalty is a linear function of p (alpha*p). Here, alpha=3.

The choice of the penalty function can depend on various criteria:
1) based on the statistical properties of the parameter estimation method that is used
2) based on a trade-off of underfit and overfit, taking into account statistical properties of the parameter estimation method that is used
3) based on a trade-off of underfit and overfit, taking into account statistical properties of the parameter estimation method that is used, taking into account finite sample effects
4) a linear function of p: Q(p)=alpha*p where alpha=2, or 3 etc.
5) a linear function of p: Q(p)=alpha*p, where alpha depends on the number of observations N
6) a linear function of p: Q(p)=alpha*p, where alpha depends on the number of observations N as alpha=log (N)

The criterion that is used in most of the cases is the Akaike Information Criterion (AIC) where Q(P)=2*P. Preferably, the penalty should increase faster than the fit decreases. In the model extraction function 350, a model order for which GIC is minimal is given by Equation 5 (Eq. 5):

$$P_{sel} = \arg\min_P GIC(P), P = 0, \ldots, P_{max} \qquad \text{Eq. 5}$$

wherein
Pmax=highest order model accommodated;
Psel=selected model order for use in representing an ELOP-layer selected macroblock as model parameters.

In the model extraction function 350, which is used as an illustrative example, the following steps are executed (e.g. for each ELOP-layer selected macroblock to be represented as equivalent parameters) when a standard non-interpolation approach is employed:
(a) parameters for all models M(P) in a sequence M(1), M(2), . . . , M(Pmax) are calculated for a selected macroblock;
(b) a corresponding statistical fit F(P) is determined for each of the models in the sequence; and
(c) the resulting series of statistical fits F(P) is searched to identify a best fit therein, namely a minimum for GIC.

In the aforementioned interpolation approach, it is assumed that the estimated models M(P) are monotonically decreasing with increasing values of the model order P. When such a situation pertains, a preferred interpolation approach can be employed as follows:
(0) a model M(P0) with a low number of parameters P0 is estimated (which does not require a lot of computations)
(A) a most complex model M(Pm) is calculated and its fit F(Pm) and corresponding GIC calculated;
(B) assuming that fit of lower-order models, namely M(Pm−1), M(Pm−2), . . . is worse (greater) than that of M(Pm), it is inferable directly that these lower-order models have a greater F(P) than the model M(Pm); thus, a new highest candidate for selection for use in the function 350 is a model of order Pm whose corresponding GIC is potentially smaller than GIC(P0), namely F(Pm)+3 Pm<GIC(P0); and
(C) step (B) is repeated if required until the fit F(P) is lower than GIC (P0).

After a number of repetitions of this procedure (F(P*)+3 P*<GIC(P0)), the value of P0 can be increased by estimating the parameters of additional low-order models (M(P0+1), M(P0+2), . . . ). This can be illustrated with reference to FIG. 16 where P0 should correspond to a low order model close to zero.

The interpolation approach enables a minimum value of GIC to be found at a greatly reduced computational cost within the function 350.

The procedure for selective estimation for statistical order selection described here yields an exact minimum if the fit F(P) is monotonically decreasing, as is the case for many parameter estimation methods. So, in this case, the resulting order is exactly equal to the order found with the standard, "full search" method, as described in the aforementioned points (a) to (c).

If the fit is monotonically decreasing on a larger scale, but some deviations of this behaviour can occur locally, the order that is selected with this procedure is still accurate, although there is no longer a guarantee that the absolute minimum is found. Most estimators that are used in practice fall in either of the two categories, namely exactly monotonically decreasing or approximately monotonically decreasing. This aspect remains valid even if applications are considered that are not related to image or video coding.

A specific example of the interpolation approach (A) to (C) will now be provided.

Figure 16:
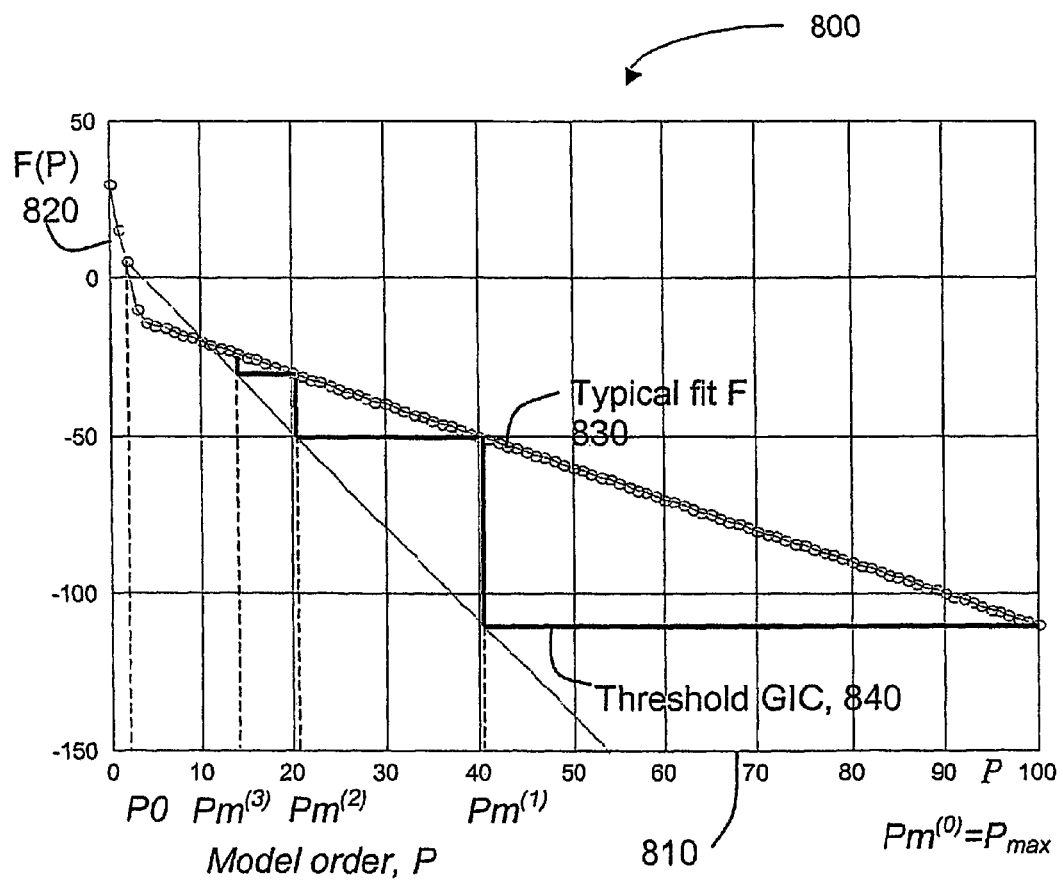
FIG. 16 is a graph illustrating interpolated ELOP macroblock model parameter optimization.

Referring to FIG. 16, where the maximum model order Pmax=100, a number of parameters that need to be estimated is given by:

1+2+ . . . 5+7+14+20+40+100=196 parameters

For comparison, the standard approach (a) to (c) needs the following number of parameters to be estimated:

1+2+3+ . . . +99+100=5050 parameters

It will be appreciated that the interpolation approach is susceptible to increasing execution speed of the function 350 for model parameter determination. Such an advantage is susceptible to enabling the function 350 to be implemented in less expensive and compact hardware and/or software, for example in inexpensive consumer products.

With reference to FIG. 16 and its associated description in the foregoing, it will be appreciated that such model order selection is susceptible to being applied in technical fields outside that of aforesaid video encoding and corresponding decoding, for example in other situations where curve fitting and analysis of stationary stochastic signals is required; stationary stochastic signals are also known as "coloured noise". The model order selection approach, elucidated with respect to FIG. 16 and its associated example, is effectively an "ARMAsel" algorithm and represents a general tool for the analysis of stationary stochastic signals. Moreover, the approach is not only usable in AR models but optionally also where Moving Averages (MA) are involved, and also for combined ARMA models. As such, the model order selection approach is capable of ensuring that more accurate models can be obtained for a wide range of mutually different types of signal.

For example, in video coding for consumer electric apparatus, contemporary video codecs, for example MPEG and H.264, are not well suited to processing image components susceptible to being characterized as coloured noise. Omitting such components renders decoded images having an artificial appearance. Using the model order selection approach of the invention, a compact and accurate data description of such coloured noise components can be derived, thus maintaining detail in decoded images rendering them more natural in appearance.

In image encoding for medical applications, noise modelling of medical images is capable of providing decoded images that are perceptually similar to corresponding original images, even where high compression ratio are used to generate associated image data. The approach employed in FIG. 16 is susceptible to being applied to determine more accurate models for use in generating such compressed data.

The aforementioned model order selection approach is also applicable to general medical data analysis, for example to the monitoring of heartbeat signals, to the analysis of lung noise for diagnostic purposes and to EEG electrical signal analysis.

It will be appreciated that the model order selection approach employed in FIG. 16 is not restricted to 1-dimensional model order selection. In particular, model order selection for 2-dimenisonal AR, MA or ARMA models is also implementable using the approach. Selection of most suitable model to yet higher-dimensional data is also accommodated by the approach, for example to 3-dimensions and above.

The aforementioned approach of model order selection is also susceptible to being employed in sound processing, especially for processing temporal noise-like components in audio signals, for example in speech and/or music. Sound signal compression is also enhanced by representation of temporal noise-like components by corresponding noise-description model parameters; selection of a suitable model order to employ in such an audio application is capable of being addressed by the aforesaid approach.

The approach to model order selection as described above is capable of being applied in a wide range of applications, for example in general digital signal processing, for example as in telecommunication systems. For example, the approach is applicable in radar systems for processing signals corresponding to radar reflections from sea waves, for example modelled using the aforementioned ARMAsel algorithm; such radar reflections are susceptible to generating corresponding signals which are highly complex and correspond to a superposition of both desired signal and noise-like components. Similarly, the approach to model order selection is also susceptible for use in modelling turbulent systems, for example as in vortex modelling.

Additionally, the aforementioned approach of model selection is also potentially applicable in vibration analysis of mechanical structures, for example air frame vibration analysis, and in the monitoring of chemical processes, especially where turbulent liquid of gaseous interactions are susceptible to occurring. In vibration analysis, mechanical structures are susceptible to exhibiting complex harmonic vibration mode spectra, moreover, vibration spectral measurement is often executed in a background of ambient temporal and/or harmonic noise; such characteristics are susceptible to being determined by the aforementioned approach.

In the foregoing, expressions such as "comprise", "comprising", "include", "including", "incorporate", "incorporating", "contain", "containing", "encompass", "encompassing", "is", "are", "has", "have" are to be construed as non-exclusive, namely that additional components or parts not explicitly declared may also be present. Such a manner of construing these terms is especially pertinent when construing the scope of the accompanying Claims.

Reference to the singular should also be construed to relate to the plural and vice versa.

The invention claimed is:

1. A data encoding system comprising:
    an encoder for receiving input data and generating corresponding encoded output data, the encoder including:
        processing means for processing the input data to generate, for each input data therein, a plurality of corresponding data layers including at least one base layer and at least one enhancement layer, wherein the processing means includes encoding means for receiving the input data and generating therefrom the encoded output data,
        the encoding means further comprising:
            block selecting means for selecting one or more sub-regions of the at least one enhancement layer, wherein the selected one or more sub-regions comprise regions determined suitable for having their enhancement layer residual data implemented by way of a parameter model, further wherein non-selected sub-regions comprise unsuitable sub-regions for modelling, and
            model extraction means for modelling the one or more suitable sub-regions for representation thereof in the encoded output data by way of descriptive model parameters.

2. The data encoding system according to claim 1, wherein the input data represent image data.

3. The data encoding system according to claim 2, wherein the processing means is operable to represent one or more principal features of each input image in its corresponding at least one base layer, and to represent residual image information corresponding to a difference between information in each input image and its corresponding at least one base layer in the at least one enhancement layer.

4. A data encoding system comprising:
    an encoder for receiving input image data and generating corresponding encoded output data, the encoder including:
        processing means for processing the input image data to generate, for each input image therein, a plurality of corresponding data layers including at least one base layer and at least one enhancement layer, wherein the processing means includes encoding means for receiving the input image data and generating therefrom the encoded output data,
        the encoding means further comprising:
            block selecting means for selecting one or more sub-regions of the at least one enhancement layer, and
            model extraction means for modelling the one or more sub-regions for representation thereof in the encoded output data by way of descriptive model parameters,
        wherein the processing means is operable to represent one or more principal features of each input image in its corresponding at least one base layer, and to represent residual image information corresponding to a difference between information in each input image and its corresponding at least one base layer in the at least one enhancement layer, and
        wherein the one or more sub-regions are represented in the encoded output data from the encoding means as corresponding data when determined by the block selecting means to be unsuitable for modelling, and represented by equivalent model parameters when determined by the block selecting means to be suitable for modelling.

5. The data encoding system according to claim 2, wherein the encoding means is arranged to encode the input data in at least one of substantially ITU-T H.264 and ISO/IEC MPEG-4 AVC standards enhanced by inclusion of the model parameters.

6. The data encoding system according to claim 1, wherein the model parameters are included into one or more private data regions of the encoded output data.

7. The data encoding system according to claim 1, wherein the encoding means is operable to apply a spatial transform for translating the at least one selected sub-region to its corresponding model parameters for inclusion in the encoded output data.

8. The data encoding system according to claim 7, wherein the spatial transform includes a discrete cosine transform (DCT).

9. The data encoding system according to claim 7, wherein the spatial transform is operable to generate a corresponding 2-dimensional data set for each corresponding sub-region, and the encoding means is arranged to concatenate the 2-dimensional data set to generate a corresponding 1-dimensional data set for inclusion in the model parameters in the encoded output data.

10. The data encoding system according to claim 1, wherein the encoding means is arranged to select a model order for use in encoding the one or more sub-regions in the corresponding model parameters by way of an optimization between quantity of model parameter data and accuracy to which the corresponding model parameters represent their one or more corresponding sub-regions.

11. The data encoding system according to claim 10, wherein the encoding means is arranged to apply a statistical test to calculate a statistical error between image data corresponding to the one or more sub-regions and their corresponding model parameters, and apply selective parameter estimation to determine the model order to employ for generating the corresponding model parameters for the encoded output data.

12. The data encoding system according to claim 1, wherein the one or more sub-regions correspond substantially to spatial noise-like features present in at least one input image of the input data.

13. The data encoding system according to claim 1, further comprising:
a decoder for receiving the encoded output data from the encoder and for decoding the encoded output data to recreate an input image of the input data, the decoder including:
decoding means for isolating the model parameters from directly encoded image data in the encoded output data,
sub-region synthesizing means for receiving the isolated model parameters and generating data corresponding to the one or more sub-regions from the isolated model_ parameters, and
data merging means for combining the synthesized sub-region data with decoded direct image data to generate decoded output image data corresponding to input image of the input data provided to the encoder.

14. The data encoding system according to claim 13, wherein the encoded output data from the encoder is conveyed to the decoder via a transmission medium, the transmission medium including at least one of: an Internet, an optical data disc, a magnetic data disc, a DVD, a CD, a solid-state memory device, and a wireless communication network.

15. An encoder for receiving input image data and generating corresponding encoded image output data, the encoder comprising:

image processing means for processing the input image data to generate for each input image therein a plurality of corresponding image layers including at least one base layer and at least one enhancement layer; and
encoding means for receiving the input image data and generating therefrom the encoded image output data, the encoding means further comprising:
block selecting means for selecting one or more sub-regions of the at least one enhancement layer, wherein the selected one or more sub-regions comprise regions determined suitable for having their enhancement layer residual data implemented by way of a parameter
model, further wherein non-selected sub-regions comprise unsuitable sub-regions for modelling, and model extraction means for modelling the one or more sub-regions for representation thereof in the encoded image output data by way of descriptive model parameters.

16. The encoder according to claim 15, wherein the image processing means is operable to represent one or more principal features of each input image in its corresponding at least one base layer, and to represent residual image information corresponding to a difference between information in the input image and its corresponding at least one base layer in the at least one enhancement layer.

17. The encoder according to claim 15, wherein the encoding means is arranged to encode the input image data in at least one of substantially ITU-T H.264 and ISO/IEC MPEG-4 AVC standards enhanced by inclusion of the model parameters.

18. The encoder according to claim 15, a decoder being operable to receive encoded image output data from the encoder and for decoding the encoded image output data to recreate a corresponding input image, the decoder including:
decoding means for isolating model parameters from directly encoded image data in the encoded image output data,
sub-region synthesizing means for receiving the isolated model parameters and generating data corresponding to one or more sub-regions from the isolated model parameters, and
data merging means for combining the synthesized sub-region data with decoded direct image data to generate decoded output image data corresponding to the image input data provided to the encoder.

19. A method of encoding image data in an encoder, the method including the steps of:
(a) arranging for the encoder to include processing means and block selecting means;
(b) applying the processing means to process the input image data to generate for each input image therein a plurality of corresponding image layers including at least one base layer and at least one enhancement layer;
(c) applying the selecting means to select one or more sub-regions of the at least one enhancement layer, wherein the selected one or more sub-regions comprise regions determined suitable for having their enhancement layer residual data implemented by way of a parameter model, further wherein non-selected sub-regions comprise unsuitable sub-regions for modelling, and modelling the one or more suitable sub-regions for representation thereof in the encoded image output data by way of descriptive model parameters; and
(d) combining the descriptive model parameters with encoded data corresponding at least partly to the plurality of image layers for generating therefrom encoded image output data corresponding to the input image data.

20. A method of processing data representative of a physical signal via a processing system, the method comprising:
determining, via a processing means of the processing system, among a number of possible models M(P) of various complexity, P being the number of parameters of the model the complexity of which increases with P, a candidate model M(Pm), that fits the data according to a fit function, denoted F(P), where F(P) decreases with P, wherein determining the candidate model M(Pm) comprises:
(a) calculating a reference model M(P0) having a reference number of parameters, denoted P0;
(b) calculating the candidate model M(Pm), Pm being higher than P0, its fit F(Pm) and a corresponding criterion, denoted G (Pm) according to the following rule:

$G(P)=F(P)+Q(P)$, where Q(P) is a penalty that increases with P and is independent of M(P), a starting value for Pm being Pmax; and
(c) determining a new model M(Pm*) whose corresponding criterion is potentially smaller than G(P0), so that F(Pm)+Q(Pm*) G(P0),
wherein one of the candidate model M(Pm) or the new model M(Pm*) is selected to enable the processing means to derive a compact and accurate data description of noise components of the physical signal for maintaining detail in the corresponding processed data.

21. The method as claimed in claim 20, wherein calculating the candidate model M(Pm) and determining a new model M(Pm*) whose corresponding criterion is potentially smaller than G(P0) are repeated with Pm replaced by Pm* until the criterion G(Pm) is lower than G(P0).

* * * * *